US005735432A

United States Patent [19]

Stoken et al.

[11] Patent Number: 5,735,432

[45] Date of Patent: Apr. 7, 1998

[54] SYSTEM FOR AND METHOD OF DISPENSING LOTTERY TICKETS

[75] Inventors: Raymond G. Stoken; Bernard J. Dobransky, Jr., both of Irwin, Pa.

[73] Assignee: Cory Consultants, Inc., Tucson, Ariz.

[21] Appl. No.: 643,313

[22] Filed: May 6, 1996

Related U.S. Application Data

[63] Continuation-in-part of Ser. No. 527,946, Sep. 14, 1995, Pat. No. 5,657,899.

[51] Int. Cl.$^6$ ........................ B65G 59/00

[52] U.S. Cl. ........................ 221/1; 273/138.2

[58] Field of Search ........................ 221/1, 2, 7, 9, 221/131, 92; 194/210, 206; 273/138.2, 138.1

[56] References Cited

U.S. PATENT DOCUMENTS 3,900,219 8/1975 D'Amato et al. ........................ 283/6
5,290,033 3/1994 Bittner et al. ........................ 273/138 A

*Primary Examiner*—Kenneth Noland
*Attorney, Agent, or Firm*—James L. Sherman

[57] ABSTRACT

A lottery ticket dispensing system is for improved pull-tab lottery tickets of a type that include a plurality of normally closed windows that can be opened to reveal play symbols thereunder with some of the play symbols being winning symbols. Each of the improved lottery tickets is also provided a normally closed bar code window with bar code markings hidden thereunder which includes ticket information for indicating each of the play symbols as aligned with its respective window. A lottery ticket dispensing machine includes a ticket storage area and means for initiating the dispensing of the ticket from the storage area toward the front panel of the machine. When the ticket is being dispensed, the bar code window is opened and the bar code revealed thereunder is aligned with a bar code reading device that is operably connected to electronic control circuitry of the machine that receives and stores the ticket information included in the bar code markings of the dispensed ticket. The front panel of the machine includes a plurality of display areas and associated switches that correspond to the windows of the ticket. Selective activation of each switch causes the electronic control circuitry to generate a display symbol in the corresponding display area which indicates the play symbol that is under the selected window of the ticket. The ticket information also includes winning information and the electronic control circuitry will receive and store the winning information in order to generate a winning indication in a separate winning display area on the front panel when any of the play symbols are winning symbols.

33 Claims, 9 Drawing Sheets

SYSTEM FOR AND METHOD OF DISPENSING LOTTERY TICKETS

This application is a continuation-in-part of application Ser. No. 08/527,946, filed Sep. 14, 1995 now U.S. Pat. No. 5,657,899.

BACKGROUND OF THE INVENTION

1. Field of the Invention

This invention relates to a system for dispensing of lottery tickets and to the method of doing the same, and more specifically, to such a system which allows a player to obtain and electronically "play" a lottery ticket of the type which has a plurality of normally closed window areas for hiding play symbols printed on an inside portion thereof. Such tickets can normally be determined to include a winning array of such symbols only upon the opening of the windows to reveal the play symbols thereunder. A dispensing machine of the system includes a plurality of display areas which directly correspond to the window areas of a ticket which has been dispensed and enables a player to electronically "play" the window areas to cause the play symbols thereunder to be seen in the respective display area of the machine without physically opening the normally closed windows of the lottery ticket.

2. Brief Description of the Prior Art

It has known to make "pull-tab" lottery tickets of the type which contain a plurality of windows which are to be opened by the player such as those disclosed in U.S. Pat. Nos. 3,900,219; 4,033,611; and 4,740,016. The configurations employed to produce the tickets disclosed in U.S. Pat. Nos. 3,900,219 and 4,033,611 are relatively complicated and have tended to lessen their acceptability as secure, reliable games of chance. The multi-layered configuration of the lottery tickets of U.S. Pat. No. 4,033,611 has been found to be more susceptible to fraudulent alteration or reconstruction. While the lottery ticket of U.S. Pat. No. 3,900,219 includes features that tend to make fraudulent opening or tampering less likely, the use of three layers of different size sheets of paper much more complicated to manufacture and expensive to provide.

These less attractive features have been eliminated in the lottery ticket disclosed in U.S. Pat. No. 4,740,016 which are formed of two sheets of paper material. One problem that could exist with such pull-tab tickets is that a losing ticket, after the windows thereof have been opened by a player, could be relatively easily and fraudulently changed into a winning ticket. Prior to the design disclosed therein, because of the relatively thick, non-transparent paper material forming the sheets, the winning symbols could be removed from a previously honored winning ticket and inserted into a losing ticket. The paper which contained the winning symbols could be removed from the winning ticket by making cuts along the four edges of the window down to the middle level of the paper. Similarly, a losing set of symbols would be removed from the losing ticket. Once the winning symbols have been placed in the losing ticket, it is difficult to detect the alteration.

U.S. Pat. No. 4,740,016 discloses a means for altering the original design of the tickets to help eliminate such fraudulent reconstruction of the tickets. The improved tickets still include the front sheet, the rear sheet, means for bonding the front sheet and the rear sheet together, and a plurality of plurality of symbols on the rear sheet facing the front sheet, which could include a set of winning symbols. However, they further include security indicia on the side of the rear sheet corresponding to the set of winning symbols. Specifically, the security indicia includes a pattern on a portion of the rear sheet that contains the winning symbols which pattern extends beyond the winning window and is partially covered by the front sheet. Another embodiment disclosed therein includes an additional or alternative security indicia in the form of a winning prize code which can also be printed on the rear sheet in a location not related to the winning symbols and not aligned with the windows. In either case, the sheets of the "winning" ticket could be separated to confirm that it is truly a winning ticket.

It is also possible to include other information within a window or tab area of a game coupon to confirm that it is in fact a game winner. The game coupon of U.S. Pat. No. 4,880,964 appears to be intended of a different purpose than the lottery tickets discussed above. Because it is to be used for promotional purposed in retail establishments, it must have means for accurate accounting records and be relatively simple and inexpensive to manufacture to permit mass distribution. Unlike pull-tab lottery tickets, the coupons are made of relatively thin paper material and rely on bar code information beneath a window that must be opened by a customer of the establishment in order to be read by a common retail scanner to determine if the game coupon is a winner.

U.S. Pat. No. 5,253,899 discloses a different type of lottery ticket device and U.S. Pat. Nos. 5,118,109 and 5,451,052 disclose very complicated scratch-off games cards but again do not appear to be related to the type of pull-tab lottery tickets discussed above.

U.S. Pat. No. 5,290,033 discloses a gaming machine and game coupons that could be in a form that is similar to the "pull-tab" lottery tickets discussed above. In some prior art machines, the player purchases game coupons from a pull-tab machine by inserting cash or game tokens. Such game coupons themselves are commonly packaged in game coupon sets. Each game coupon set comprises a known total of individual game coupons and a known number of winning game coupons within the total. Individual game coupons usually formed of two sheets: a facing sheet and a backing sheet. Serrated windows or tabs are formed in the facing sheet of the coupon. The backing sheet is imprinted with game symbols or other representations beneath the windows or tabs. To determine whether or not an individual game coupon was a winning coupon, a player peeled back the window or tab to reveal the game symbols. Winning game coupons could be redeemed for cash winnings, game tokens or other prizes with a cashier.

According to U.S. Pat. No. 5,290,033, an important disadvantage of such gaming machines was the significant time and effort being consumed, by both the player and the proprietor of the gaming establishment, in redeeming the winning coupons for cash. During the time it took to cash in a winning coupon, a player could lose interest in the game. Accordingly, the improved gaming machine and game coupons included means for the player to continue playing a game without interruption by the utilization of the winning game coupons at the machine itself to purchase additional game credits. The improved means taught therein includes providing the game symbols and a bar code on the back surface of a single, removed playing portion of a "preferred" game coupon which includes only the single playing portion or window. The single playing portion, after removal from the facing and backing layers of the game coupon by the player, is said to be advantageous because it can be provided such a bar code and is in a single sheet form that can easily be inserted into a game coupon reader, as part of a bill validator, for verification and for issuing game credits. The pull-tab lottery tickets discussed above, which include a plurality of windows or tabs, retain the two layers form and are not considered preferred in U.S. Pat. No. 5,290,033 because of the difficulty of providing any coupon verification device that could accept lottery coupons or tickets that have a plurality of opened windows or tabs extending from the surface thereof. In any case, the bar code of these playing portions of the improved game coupons are said to include ten decimal digits which can be decoded by a standard bar code reader. The information in the bar code appears to be generally limited to the game set or lot number which is identical for all of the game coupons of the set, to a unique coupon identification code that can be recorded to insure that the same coupon is not verified twice and to a prize code indicating the number of prize credits associated with the winning game coupon.

U.S. Pat. Nos. 5,348,299; 5,377,975; and 5,487,544 disclose a different electronic gaming apparatus that includes yet another form of pull-tab coupon configuration. Rather than individual tickets, the game apparatus includes a primary strip of a suitable substrate in the form of a roll. Indicia is printed in individual strip segments. Upon actuation of the apparatus, a segment of the strip is severed to provide a strip segment or game card and is dispensed. If the indicia on the severed segment corresponds to a winning indicia, the player would win the game and the game card or ticket could be redeemed for winnings. The preferred configuration includes a duplicate copy of each severed segment of the primary strip, containing the same indicia as the primary strip segment, which is maintained on a duplicate strip and stored for purposes of later auditing. This second strip is in roll form that is to be stored within the apparatus.

Although this overall configuration, including a primary strip in roll form and a secondary strip in roll form for retention within the apparatus, may experience limited acceptance in the gaming art, U.S. Pat. Nos. 5,348,299; 5,377,975; and 5,487,544 do disclose addition features which are of interest. It appears that the secondary strip of indicia also contains a bar code printed on the back thereof corresponding to the indicia printed on each strip segment of the primary strip that is to be dispensed. The apparatus includes an electronic display and means for reading and storing the information of the bar code so that, as the segment of the strip is dispensed from the apparatus, the results of the play of the dispensed segment is simultaneously displayed on the screen. It should be noted that the segments of the strip are similar to the preferred game coupons of U.S. Pat. No. 5,290,033 having only one window or tab. They appear to include only one play area which is revealed after the segment is separated from the primary strip and dispensed from the apparatus. Accordingly, when the segment of the strip is dispensed, the indicia of the of the entire play area is displayed on the screen.

U.S. Pat. Nos. 5,290,033; 5,348,299; 5,377,975; and 5,487,544 include interesting pull-tab lottery ticket dispensing machines that employ game coupons or strip segments that include bar code information for the purposes disclosed therein. However, both of these configurations are missing one of the primary features of the type of pull-tab lottery ticket disclosed in U.S. Pat. No. 4,740,016. Many popular pull-tab lottery tickets include the multi-window configuration having a plurality of play areas that enhance the playing enjoyment of the player. With such a pull-tab lottery ticket, the player has several chances to win within the same lottery ticket and, by allowing the separate and selective opening of the plurality of windows or tabs, there is heightened suspense during the play as each window or tab is opened. Such pull-tab lottery tickets having a plurality of windows or tabs are very popular and have experienced wide acceptance among players because each ticket appears to provide multiple opportunities to win.

U.S. Pat. Nos. 4,677,553 and 4,725,079 disclose instant lottery tickets that include different forms of numerical or bar codes on the surfaces thereof to assist in the verification and validation of winning tickets but are not directed to nor configured for the preferred pull-tab lottery tickets having a plurality of windows as discussed above. In addition to the various dispensing machines discussed above, U.S. Pat. Nos. 2,657,750; 4,272,001; and 5,335,822 disclose different machine configurations that have previously been employed to dispense tickets or the like.

OBJECTS OF THE INVENTION

It is an object of the invention to provide a lottery ticket dispensing system for lottery tickets which include a plurality of windows or tabs having a plurality of play symbols thereunder, some of which may be winning symbols, wherein the system employs a machine for the selective displaying of the play symbols in each window after a lottery ticket is dispensed from the machine.

It is another object of the invention to provide such a lottery ticket dispensing system which includes a winning display on the machine which is indicative of winning symbols which may exist in any lottery ticket which has been dispensed from the machine.

It is a further object of the invention to provide such a lottery ticket dispensing system which includes game information on the front panel of the machine regarding all of the possible winning symbols for the lottery tickets in the ticket storage area and the winning display is positioned relative to the game information on the front panel.

It is yet another object of the invention to provide an improved lottery ticket having the plurality of play areas printed on an interior surface that are hidden by the normally closed windows thereof which ticket also includes a bar code on the interior surface which includes the ticket and winning information needed to enable the displaying on the machine.

It is still another object of the invention to provide the improved lottery tickets with a normally closed bar code window hiding the bar code to prevent access to the ticket and winning information therein unless the bar code window is opened.

It is a further object of the invention to provide a lottery ticket dispensing system for the improved lottery tickets which includes a dispensing machine having means for opening the bar code window of each ticket that is dispensed therefrom to provide access to the bar code therebeneath and means for selectively displaying the play symbols in each window after the lottery ticket is dispensed from the machine.

These and other objects of the invention are provided in a preferred embodiment thereof which includes a lottery ticket dispensing system for lottery tickets of the type which includes a front sheet having a window configuration which is normally closed and a rear sheet, which front sheet and rear sheet are bonded together. There are play symbols on an inward side of the rear sheet toward an inward side of the front sheet which play symbols are capable of being winning symbols. The play symbols are located in play regions on the inward side of the rear sheet in alignment with the window configuration which is for being opened to reveal the play symbols in the play regions thereunder. The lottery ticket dispensing system includes a bar code window in one of the front sheet and the rear sheet of the lottery ticket which bar code window is normally closed. There are bar code markings for each lottery ticket on at least one of the inward side of the bar code window and the inward side of the other of the rear sheet and the front sheet in alignment with the bar code window. The bar code markings include ticket information for indicating the play symbols in the play regions as aligned with the window configuration. A lottery ticket dispensing machine includes a housing and a front panel. There is ticket storage in the housing for storing a plurality of the lottery tickets. An electronic control circuit in the housing includes ticket dispensing for dispensing each lottery ticket from the ticket storage for advancement toward the front panel. A bar code window opening element is in the housing for opening the bar code window to reveal the bar code markings of each lottery ticket dispensed from the ticket storage. A bar code reading device in the housing adjacent to the bar code window opening element is operably connected to the electronic control circuit for reading and identifying the bar code markings of each lottery ticket and for storing the ticket information in the electronic control circuit regarding the play symbols as located in the play regions as each lottery ticket advances toward the front panel. The front panel has display areas which directly correspond to the play regions on the inward side of the rear sheet of the lottery ticket. The display areas are operably connected to the electronic control means for receiving display signals therefrom. An actuation signal is provided to the electronic control circuit to cause it to generate the display signals for the display areas to produce display symbols in the display areas. For each lottery ticket having been dispensed from said ticket storage, the display symbols in the display areas are directly indicative of the play symbols of the play regions which correspond to the display areas.

In the preferred lottery ticket dispensing system, the bar code window opening element includes a ticket advancing device in the housing for advancing each lottery ticket dispensed from the ticket storage toward the bar code reading device. The preferred lottery ticket includes a center and a leading end edge during the advancing toward the bar code reading device. The bar code window is disposed adjacent the leading end edge of the lottery ticket and includes an opening edge which forms part of the leading end edge of the lottery ticket and a hinge edge which is parallel with the leading end edge of the lottery ticket and is displaced therefrom toward the center of the lottery ticket. The bar code window opening element includes a retarding feature for retarding the opening edge relative to a remainder of the lottery ticket to cause the bar code window to hinge at the hinge edge during the advancing toward the bar code reading device. The retarding feature can include a hook element for hooking the opening edge of the bar code window during the advancing toward the bar code reading device. The opening edge of the bar code window preferably includes an edge strip of the rear sheet along the leading end edge of the lottery ticket to reinforce the opening edge during the opening of the bar code window by the hook element.

In the preferred lottery ticket dispensing system, the ticket storage includes a discharge chute for passage of the lottery ticket from an interior of the housing to an exterior of the housing at the front panel. The discharge chute includes the ticket advancing device for advancing each lottery ticket dispensed from the ticket storage toward the bar code reading device. The bar code reading device is aligned with the discharge chute and any lottery ticket therein.

The ticket information of the bar code markings can include winning information when the play symbols are winning symbols. The front panel includes a winning display area. The electronic control circuit identifies and stores the winning information and generates a winning signal when the winning information is in the ticket information. The winning display area is operably connected to the electronic control circuit for receiving the winning signal therefrom. The winning signal produces a winning indication in the winning display area after the electronic control circuit generates the display signals for the display areas. Additionally, the front panel includes game information indicating a plurality of possible winning symbols associated with the lottery tickets in the ticket storage and the winning indication in the winning display area is displayed relative to a corresponding winning symbol in the game information on the front panel.

In the preferred lottery ticket dispensing system, there can be provided switch element for providing the actuation signal which switch element is on the front panel associated with the display areas. The switch element is operably connected to the electronic control circuit. The switch element is for being selectively actuated to provide the actuation signal to the electronic control circuit to cause the electronic control circuit to generate the display signals for the display areas.

In the preferred lottery ticket dispensing system, the bar code window is in the front sheet and the bar code markings are on the inward side of the rear sheet of each lottery ticket.

In another embodiment of the invention, a lottery ticket dispensing system for lottery tickets of the type which includes a front sheet having windows which are normally closed and a rear sheet with the front sheet and the rear sheet being bonded together. A plurality of play symbols is on an inward side of the rear sheet toward an inward side of the front sheet. At least some of the play symbols are capable of being winning symbols. The play symbols are respectively located in various regions of the inward side of the rear sheet aligned with the windows. The windows are for being selectively opened to reveal the play symbols in the various regions thereunder. The lottery ticket dispensing system includes a bar code window in one of the front sheet and the rear sheet of the lottery ticket which bar code window is normally closed. Bar code markings for each lottery ticket are on at least one of the inward side of the bar code window and the inward side of the other of the rear sheet and the front sheet in alignment with the bar code window. The bar code markings include ticket information for indicating each of the play symbols in the various regions as aligned with the windows. A lottery ticket dispensing machine includes a housing and a front panel. There is ticket storage in the housing for storing a plurality of the lottery tickets. An electronic control circuit in the housing includes ticket dispensing element is for dispensing each lottery ticket from the ticket storage for advancement toward the front panel. A bar code window opening element is in the housing for opening the bar code window to reveal the bar code markings of each lottery ticket dispensed from the ticket storage. A bar code reading device in the housing adjacent to the bar code window opening element is operably connected to the electronic control circuit for reading and identifying the bar code markings of each lottery ticket and for storing the ticket information in the electronic control circuit regarding each of the play symbols as located in the various regions as each lottery ticket advances toward the front panel. The front panel has a plurality of display areas which directly correspond to the various regions on the inward side of the rear sheet of the lottery ticket. Each of the display areas is operably connected to the electronic control circuit for receiving display signals therefrom. The front panel has switch elements associated with each of three display areas. Each of the switch elements is operably connected to the electronic control circuit to provide an actuation signal to the electronic control circuit to cause the electronic control circuit to generate the display signal for each display area associated with the switch elements. The display signal produces a display symbol in the display area. For each lottery ticket having been dispensed from the ticket storage, the display symbol in each display area is directly indicative of the play symbol of each of the various regions which corresponds to the display area associated with each switch element that has been selectively actuated. Additionally, the bar code window opening element can include a ticket advancing feature in the housing for advancing each lottery ticket dispensed from the ticket storage toward the bar code reading device. The ticket storage includes a discharge chute for passage of the lottery ticket from an interior of the housing to an exterior of the housing at the front panel. The discharge chute includes the ticket advancing feature for advancing each lottery ticket toward the bar code reading device. The bar code reading device is aligned with the discharge chute and any lottery ticket therein.

The preferred lottery ticket dispensing system can include the ticket information of the bar code markings also including winning information when the play symbols are winning symbols. The front panel includes a winning display area. The electronic control circuit identifies and stores the winning information and generates a winning signal when the winning information is in the ticket information. The winning display area is operably connected to the electronic control circuit for receiving the winning signal therefrom. The winning signal produces a winning indication in the winning display area after the electronic control circuit generates the display signals for the display areas. The front panel can also include game information indicating a plurality of possible winning symbols associated with the lottery tickets in the ticket storage. The winning indication in the winning display area is displayed relative to a corresponding winning symbol in the game information on the front panel.

The lottery ticket dispensing system can include the front panel having a combined switch element. The combined switch element is operably connected to the electronic control circuit and is capable of being actuated to generate the display signals for all of the display areas associated with the switch elements for each lottery ticket having been dispensed from the ticket storage means to produce the display symbols in all of the display areas.

In the preferred lottery ticket dispensing system, the bar code window is in the front sheet and the bar code markings are on the inward side of the rear sheet of each lottery ticket.

Still further, the preferred embodiment of the invention can include a method of dispensing lottery tickets of the type which includes a base sheet having a plurality of play symbols respectively disposed within a plurality of regions on an inward side of the base sheet. A cover sheet has an inward side disposed over the inward side of the base sheet. The cover sheet having normally closed window means aligned with the plurality of regions to hide the play symbols thereunder, and at least some of the play symbols capable of being winning symbols. The method comprises the steps of: (1) providing bar code markings for each lottery ticket on a bar code portion of the inward side of one of the base sheet and the cover sheet which bar code markings include ticket information for indicating each of the play symbols as arranged in the plurality of regions on the inward side of the base sheet; (2) providing a machine having a housing and a front panel; (3) storing a plurality of the lottery tickets in the housing; (4) dispensing a lottery ticket from the housing to the front panel; (5) relatively separating the bar code portion of the inward side of said one of the base sheet and the cover sheet and a corresponding portion of the inward side of the other of the base sheet and the cover sheet to reveal the bar code markings of each lottery ticket during the dispensing from the housing; (6) reading the bar code markings to identify the ticket information and storing the ticket information regarding each of the play symbols as arranged in the plurality of regions on the inward side of the base sheet after the relatively separating; (7) providing a plurality of display areas on the front panel which directly correspond to the plurality of regions having play symbols; and (8) utilizing the ticket information from the storing to display a display symbol in the display area which is directly indicative of the play symbol of each of the regions on the inward side of the base sheet of the lottery ticket that has been dispensed from the housing.

The method of dispensing lottery tickets can further include the providing the bar code markings for each lottery ticket to include the steps of providing a bar code window in one of the cover sheet and the base sheet of each lottery ticket which bar code window is normally closed and locating the bar code portion on at least one of the inward side of said bar code window and the inward side of the other of the base sheet and the cover sheet in alignment with the bar code window to hide the bar code markings thereunder when the bar code window is closed. The relatively separating the bar code portion and the corresponding portion includes the step of opening the bar code window. The method of dispensing lottery tickets can also include the providing the bar code window is in the cover sheet and the locating the bar code portion is on the inward side of the base sheet in alignment with the bar code window in the cover sheet of each lottery ticket.

In the preferred method of dispensing lottery tickets, the opening the bar code window occurs during a step of advancing the lottery ticket prior to the reading the bar code markings during the dispensing to the front panel. With the lottery ticket including a center and a leading end edge during the advancing, the method further includes the step of providing the bar code window adjacent the leading end edge of the lottery ticket with an opening edge which forms part of the leading end edge of the lottery ticket and a hinge edge which is parallel with the leading end edge of the lottery ticket and is displaced therefrom toward the center of the lottery ticket. The opening the bar code window includes retarding the opening edge relative to a remainder of the lottery ticket to cause the bar code window to hinge at the hinge edge during the advancing prior to the reading of the bar code markings. The retarding includes hooking the opening edge of the bar code window during the advancing.

The method of dispensing lottery tickets can include, in the dispensing the lottery ticket, discharging the lottery ticket from an interior of the housing to an exterior of the housing at the front panel along a discharge chute. A further step includes advancing the lottery ticket along the discharge chute during the reading of the bar code markings for continued passage to the front panel after the storing of the ticket information. Additionally, the method of dispensing lottery tickets further includes the step of temporally discontinuing the advancing of the lottery ticket along the discharge chute with the bar code markings of the lottery ticket aligned in the discharge chute for the reading of the bar code markings until the reading is properly completed.

In the preferred method of dispensing lottery tickets, the providing of the bar code markings on each lottery ticket can further include winning information when the play symbols are winning symbols. The reading of the bar code markings is to identify and store the winning information as the lottery ticket is dispensed from the housing. Further steps include providing a winning display area on the front panel and displaying a winning indication in the winning display area when displaying the display symbols in the display areas when an associated region has play symbols which are winning symbols. Additional steps include providing currency receiving component in the housing for receiving currency of a predetermined amount and dispensing the lottery ticket after the currency of the predetermined amount has been received in the currency receiving component.

An improved lottery ticket is for being dispensed by a machine and is of the type which includes a front sheet having windows which are normally closed and a rear sheet with bonding between the front sheet and the rear sheet. Play symbols are on an inward side of the rear sheet toward an inward side of the front sheet. The play symbols are capable of being winning symbols The play symbols are located in play regions on the inward side of the rear sheet in alignment with the windows. The windows are for being opened, after the lottery ticket is dispensed from the machine, to reveal the play symbols in the play regions thereunder. The improvement includes a bar code cover on one of the front sheet and the rear sheet of the lottery ticket. There are bar code markings for the lottery ticket on one of the front sheet and the rear sheet in alignment with the bar code cover. The bar code cover is normally in a position to cover the bar code markings to prevent any viewing thereof when stored in the machine. The bar code cover is for being removed by the machine during the dispensing thereof to reveal the bar code markings thereunder. The bar code markings include ticket information capable of being read by the machine after the removal of the bar code cover by the machine for indicating the play symbols in the play regions as aligned with the windows.

Another improved lottery ticket is of the type which includes a front sheet having windows which are normally closed, a rear sheet, and features for bonding the front sheet and the rear sheet together. Play symbols are on an inward side of the rear sheet toward an inward side of the front sheet. The play symbols are capable of being winning symbols and are located in play regions on the inward side of the rear sheet in alignment with the windows, and the windows are for being opened to reveal the play symbols in the play regions thereunder. The improvement includes a bar code window in one of the front sheet and the rear sheet of the lottery ticket which bar code window is normally closed. Bar code markings for the lottery ticket are on .at least one of the inward side of the bar code window and the inward side of the other of the rear sheet and the front sheet in alignment with the bar code window. The bar code markings include ticket information for indicating the play symbols in the play regions as aligned with the window means. The bar code window is for being opened to reveal the bar code markings thereunder. The ticket information of the bar code markings can include winning information when the play symbols are winning symbols. The preferred bar code window is in the front sheet and the preferred bar code markings are on the inward side of the rear sheet of each lottery ticket.

The improved lottery ticket includes a center and an end edge. The bar code window is preferably disposed adjacent the end edge of the lottery ticket to include an opening edge which forms part of the end edge of the lottery ticket and a hinge edge which is parallel with the end edge of the lottery ticket and is displaced therefrom toward the center of the lottery ticket. The bar code window is for being opened by being hinged at the hinge edge relative to a remainder of the lottery ticket. The opening edge of the bar code window includes an edge strip of the rear sheet along the end edge of the lottery ticket to reinforce the opening edge during the opening of the bar code window.

DETAIL DESCRIPTION OF THE PREFERRED EMBODIMENTS

Figure 1:
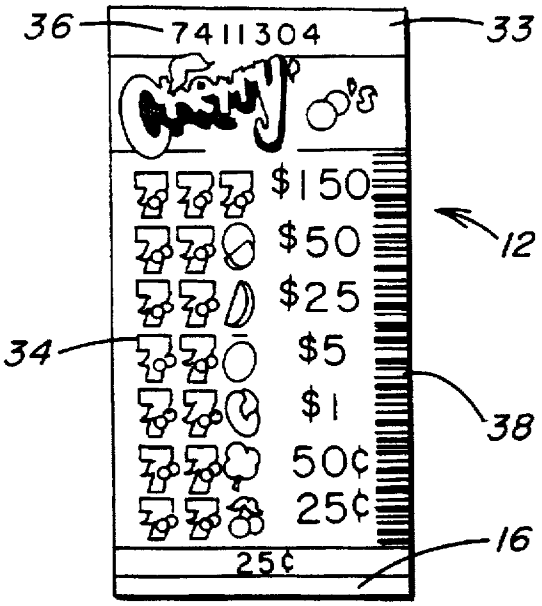
FIG. 1 is a back view of a lottery ticket which includes various features of the invention and which can be employed in a preferred embodiment of the invention.
Figure 2:
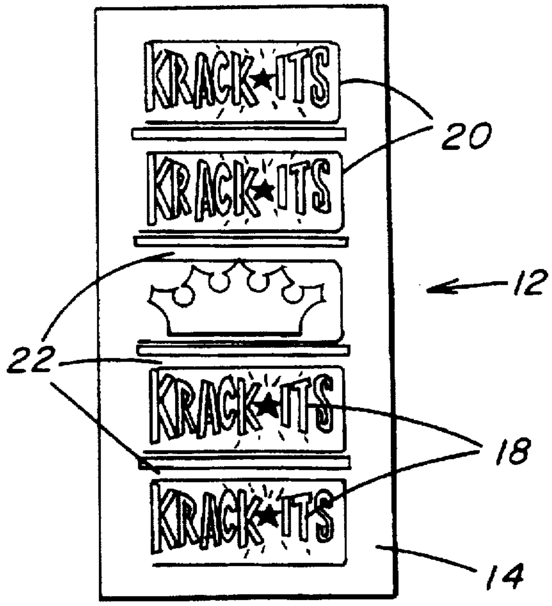
FIG. 2 is a front view of the lottery ticket of FIG. 1.
Figure 3:
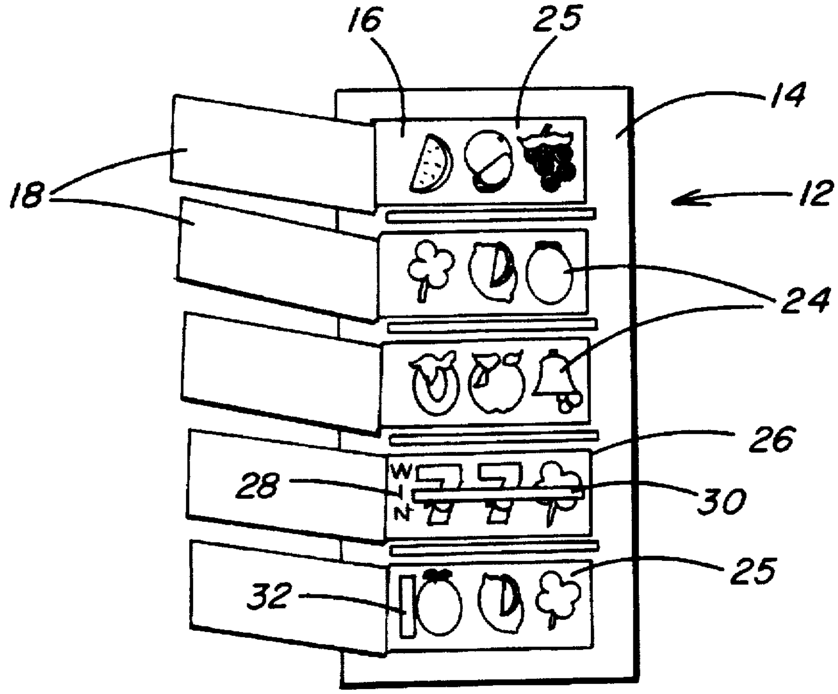
FIG. 3 is another front view of the lottery ticket of FIG. 2 with the windows open to reveal the play symbols thereunder.

As seen in FIGS. 1, 2 and 3, a preferred lottery ticket dispensing system of the invention includes lottery tickets 12 of the type which are similar to the pull-tab lottery tickets disclosed in U.S. Pat. No. 4,740,016. Such a lottery ticket 12 includes a front sheet 14 and a rear sheet 16 which are generally joined together to provide a unitary structure for the ticket 12. The front sheet 14 includes a plurality of "closed" windows or tabs 18 which are formed by the perforations 20 of the front sheet material along three edges of the window 18 (as seen in FIG. 2) and can be opened by tearing along the perforations 20 and bending the front sheet material back along the fourth edge of the window 18 (as seen in FIG. 3). The front sheet 14 and the rear sheet 16 are bonded along the edges of the ticket 12 and in the regions 22 between the windows 18.

The preferred lottery ticket 12 includes the plurality of windows 18 which are to be selectively opened by the player to reveal a plurality of play symbols 24 printed on the inside surface 25 of the rear sheet 16 in alignment with each of the windows 18. The objective of the game is find various play symbols 24 which are particularly configured to be classified as winning symbols 26. The particular lottery ticket 12 shown in FIG. 2 includes a play symbol 24 in the first or upper window 18 which includes a combination of a "watermelon", an "orange", and "grapes" that is not winnings symbol 26. However, the fourth window 18 includes a play symbol 24 of two "sevens" and a "clover" that is a winning symbol 26. Consequently, the player of the particular lottery ticket 12 shown in FIGS. 1, 2 and 3 would find that a winning symbol 26 in the fourth window 18 exists and that there is further indication of a win by the printing of "win" 28 and an additional "line" 30 across the winning symbol 26. Still further, to provide another level of security, of a type generally disclosed and discussed in U.S. Pat. No. 4,740,016, the fifth or bottom window 18 includes an additional winning indication in the form of the printed "monetary amount" 32.

As seen in FIG. 1, the back 33 of the rear sheet 16 preferably includes a significant amount of information that is both helpful to the player and useful for the practice of some of the embodiments of the invention. Specifically, the back 33 includes game information 34 in the form of a series or list of symbols which comprise all of the possible winning symbols 26 for the particular game of this ticket 12. Such lottery tickets are typically printed in lots of several thousand with the specific number of winning symbols and the corresponding monetary amount for each win being included among the lottery tickets of the lot. The back 33 of the rear sheet 16 also includes a "lot number" 36 for this particular lot which is printed on each and every lottery ticket 12 of the lot to further assure the integrity of the entire lot of such lottery tickets 12.

As thus described, the lottery ticket 12 includes features which are well-known in the prior art. The manufacture of such lottery tickets is fairly complicated in order to be able to include all of the proper play symbols 24, winning symbols 26, "wins" 28, "lines" 30, and "monetary amounts" 32 in the proper locations and in the proper numbers. After the rear sheets 16 are printed and bonded to the front sheets 14, the lottery tickets 12 are systematically shuffled so that no one would be able to determine which lottery tickets 12 include winning symbols 26. The player is able to purchase a lottery ticket 12 and to selectively open the windows 18 to reveal the play symbols 24 thereunder to see if it includes any winning symbols 26. It has been found that the player typically enjoys the ability to separately open all of the windows 18 with the attendant suspense of a possible win each time a window 18 is opened. It gives the player the feeling that there are several opportunities to win with each lottery ticket 12. In fact, some pull-tab lottery tickets can include more than one set of winning symbols and can even be configured to include winning symbols in vertical or diagonal lines that extend across adjacent windows.

Nevertheless, lottery tickets 12 differ from those of the prior art by the inclusion of preferred bar code markings 38. The bar code markings 38 on each of the lottery tickets 12 includes ticket information for indicating each of the play symbols 24 as aligned with its respective window 18 in the front sheet 14. As will be discussed below, the preferred bar code markings 38 also include winning information to indicate which of the play symbols 24 are winning symbols 26. The purpose of bar code markings 38 on each lottery ticket 12 is to include enough information to allow a preferred lottery ticket dispensing machine 40 of the invention to dispense the particular ticket 12 in a manner which will enable a player to selectively determine the play symbol 24 in each window 18 and to see if any are winning symbols 26. It should be clear that the inclusion of such bar code markings 38 on the tickets 12 further complicates the manufacture of the pull-tab tickets as discussed above. The printing of the bar code markings 38 including the specific ticket information and winning information must be coordinated with the printing of the specific play symbols on the opposite sides of the rear sheet 16 prior to it being joined to the front sheet 14.

Figure 4:
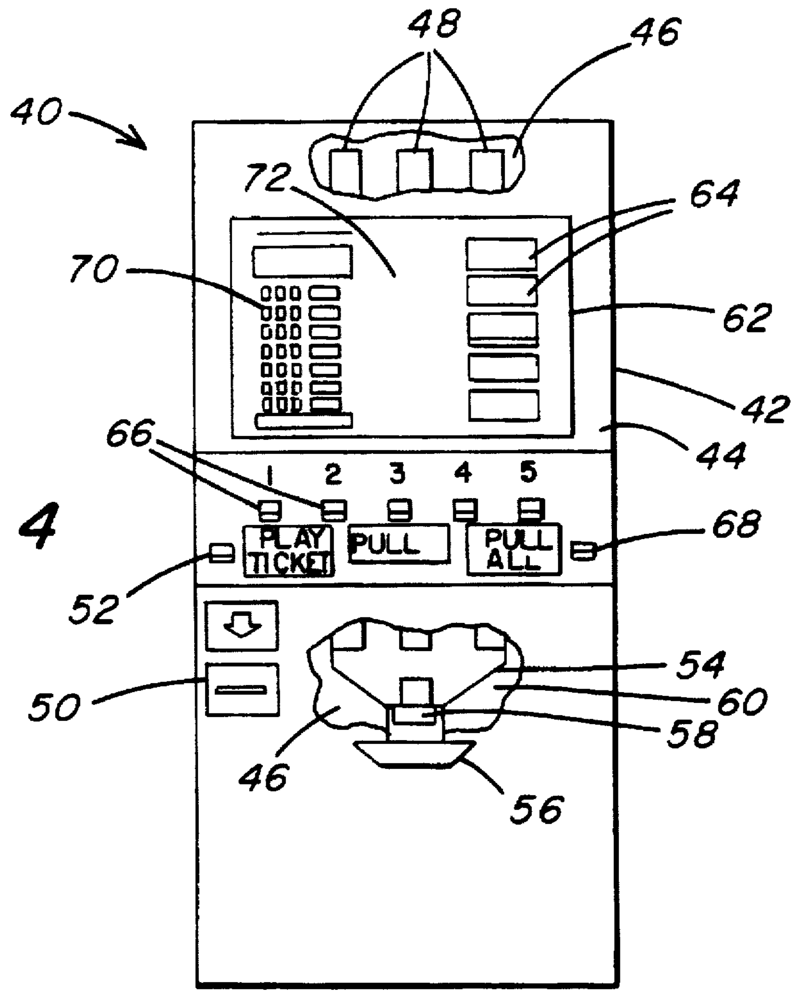
FIG. 4 is an elevational view, including fragmentary portions, of the front of a preferred lottery ticket dispensing machine including various features of the invention.
Figure 5:
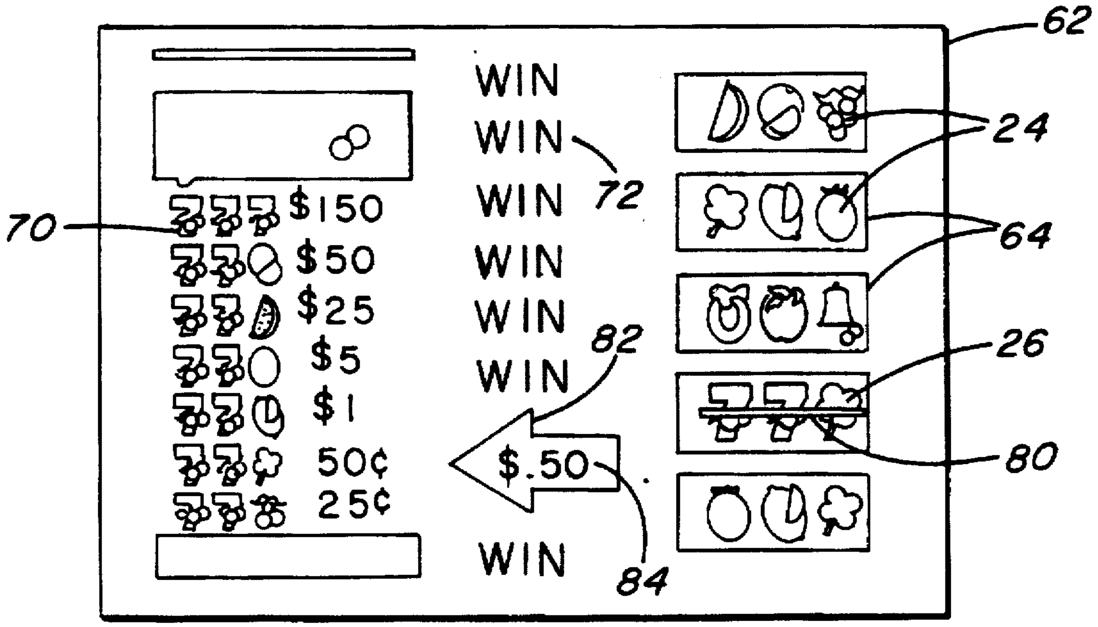
FIG. 5 is an enlarged view of the display screen of the lottery ticket dispensing machine of FIG. 4.
Figure 6:
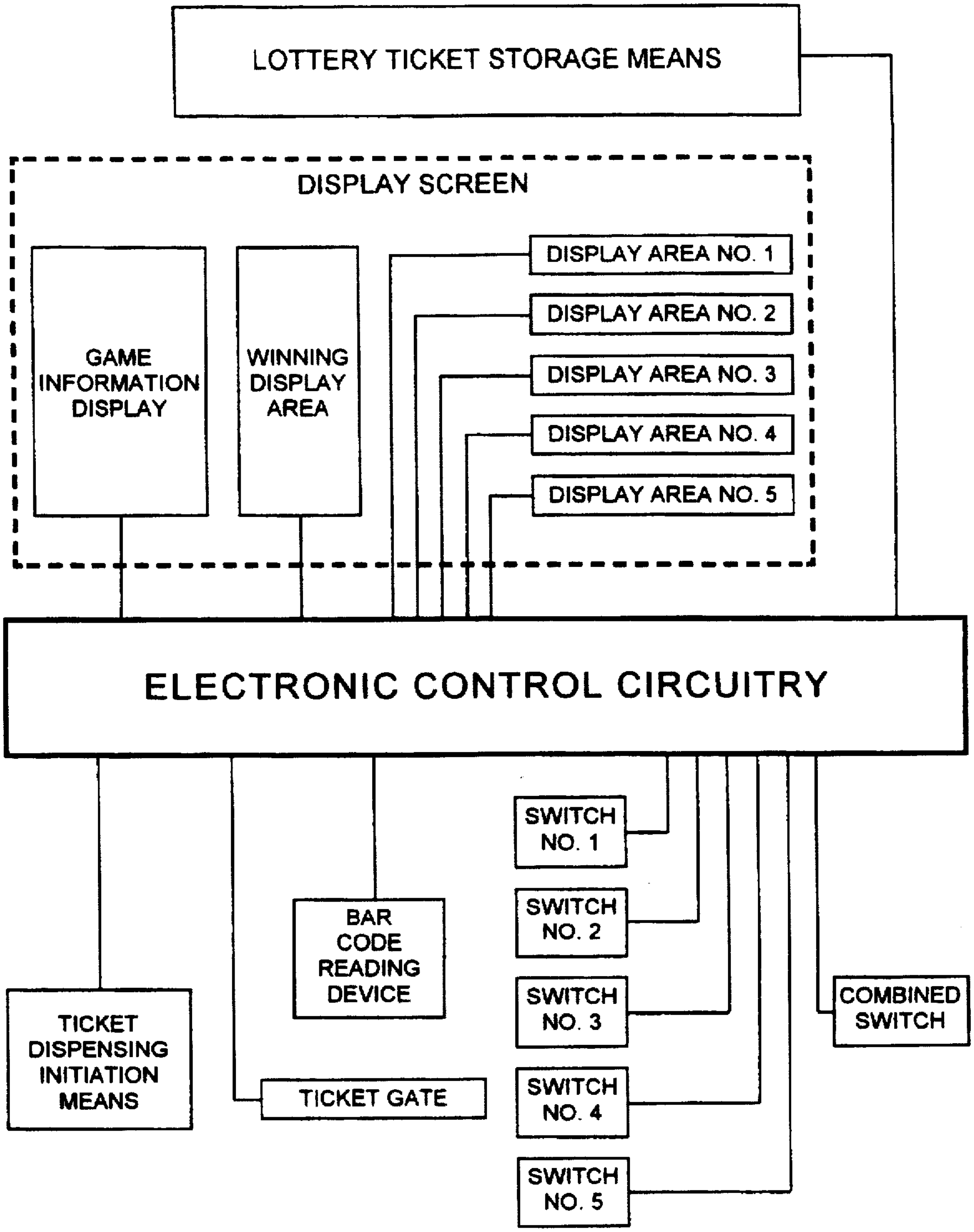
FIG. 6 is a block diagram demonstrating the relationships of the operating components of the lottery ticket machine of FIG. 4 including various features of the invention.

As seen in FIGS. 4, 5 and 6, the preferred lottery ticket dispensing machine 40 includes a housing 42 and a front panel 44. The interior 46 of the housing 42 includes ticket storage means which preferably includes three ticket racks 48 for holding stacks of lottery tickets 12. The housing 42 also includes ticket dispensing initiation means in the form of a currency accepting and verifying device 50 of the type which is well-known in the vending machine art. The preferred currency accepting and verifying device 50 will accept bills but could be of the type that accepts coins or even credit cards to record game credits which will be reduced each time a lottery ticket 12 is dispensed from one of the ticket racks 48. The ticket 12 is dispensed each time a "play" button 52 of the ticket dispensing initiation means is pushed after a proper amount of currency is deposited in the device 50. The device 50 and button 52 are operably connected to electronic control means (FIG. 6) which is preferably in the form of a printed circuit board and associated wiring in the housing 42 which connects various components of the machine 40.

The bottoms of the ticket racks 48 are aligned with a discharge chute 54 which is adapted to direct the passage of each ticket 12 from the ticket storage means in the interior 46 of the machine 40 to a tray 56 on the front panel 44. The chute 54 narrows to direct the ticket 12, independent of which of the racks 48 provides the ticket 12, to ticket retarding means (FIG. 6) which is preferably in the form of a normally closed gate 58. The electronic control means controls the gate 58 to cause is to remain closed to align the ticket 12 in the chute 54 with a bar code reading device 60 of a well-known type which is capable of reading the bar code markings when the ticket 12 is in a stationery position.

Such bar code reading devices 60 are capable of reading the bar code markings 38 several times, if necessary, to insure an accurate reading and the electronic control means is configured to not open the gate 58 until the ticket information in the bar code markings 38 is identified and stored in the electronic control means. When the gate 58 is opened, the lottery ticket is deposited in the tray 56 to be retrieved as desired by the player. Of course, the player can physically take the ticket 12 and selectively open each of the windows 18 to determine if there are any winning symbols therein.

However, the front panel 44 of the preferred machine 40 includes an electronic display screen 62 which is capable of displaying the various play symbols 24 on the lottery ticket 12 for the player. The display screen 62 includes a plurality of display areas 64 which correspond to the windows 18 of the lottery ticket 12 which has been dispensed from the machine 40. The front panel 44 also includes a plurality of switches 66 which are directly associated with the display areas 64. Each of the switches 66 and display areas 64 are operably connected to the electronic control means so that an activation signal from one of the switches will cause the electronic control means to generate a display signal for its corresponding display area 64. As seen in FIG. 4, the first and second switches 66 have been activated and the first and second display areas 64 of the display screen 62 have been energized to display the play symbols 24 which are aligned with the first and second windows 18 of the ticket 12.

The player can selectively energize each of the switches 66 in any desired order to experience the complete suspense and enjoyment of the game to the same extent that would be possible by directly opening the windows 18 of the lottery ticket 12. However, since some players may periodically wish to quickly observe the play symbols 24 under all of the windows 18, the front panel 44 alternatively includes a combined switch 68 which can be activated to cause the electronic control means to generate a display signal for each of the display areas 64 to reveal all of the play symbols 24 aligned with the windows 18 of the ticket 12 dispensed from the machine 40.

The display screen 62 also includes a game information display area 70 and a winner display area 72 in order to provide additional features of the invention which can be conveniently used to play the game. As best seen in FIG. 5, the game information display area 70 is similar to the back surface 33 of the rear sheet 16 of the lottery ticket 12. In other words, all of the information available to a player regarding possible wins, the amount of winnings and the likelihood of obtaining such winning tickets 12 is included in the game information display area 70. The area 70 including the game information is generated by the electronic control means (FIG. 6) within the housing and would be changed to reflect a different game if different lottery tickets 12 were to be supplied to the ticket storage means of the machine 40. The game information of the preferred machine 40 is not included in the ticket information of the bar code markings 38 but is included in the memory of the electronic control means so that it may be continuously displayed in the area 70 before any tickets 12 are dispensed from the machine 40 and until all of the tickets 12 are dispensed and a different ticket is to be provided thereby.

With the game information display area 70 and with the display areas 64 which could include all of the play symbols 24 under the various windows 18 of the ticket 12 which has been dispensed from the machine, a player should be able to determine if there are any winning symbols 26 without having to physically open any of the windows 18. However, the preferred display screen 62 of the machine 40 also includes the winning display area 72 to provide a positive indication of a winning ticket 12 in the event that a player does not recognize the winning symbols 26 or is not sure what the winning amount of the winning ticket 12 might be. Accordingly, The preferred bar code markings 38 of each lottery ticket 12 includes winning information in the ticket information. When the bar code reading device 60 reads the markings 38 on the lottery ticket 12 being dispensed from the ticket storage means, the electronic control means stores the winning information. As seen in FIG. 4, the winning display area 72 includes no winning information because neither of the play symbols 24 in the first two display areas 64 are winning symbols 26. Although the ticket 12 having been dispensed form the machine 40 of FIG. 4 includes winning information (because of the winning symbol 26 in the fourth window 18), the winning signal is not generated for use in the winning display area 72 until after the fourth switch 66 (or the combined switch 68) has been activated. To do otherwise would allow winning information to be provided to the player before desired and would ruin the suspense of the game. Although a winning signal could, in one embodiment of the invention, be generated immediately after the switch associated with a display area 64 having a winning symbols 26, in the preferred machine 40, the existing winning signal or signals will be generated by the electronic control means only after all of the switches 66 have been activated or the combined switch 68 has been activated to provide some indication in the winning display area 72 of the existence of a winning ticket 12. By delaying the winning signal in this manner, full suspense is maintained during the play of the game and the player will not prematurely assume that there is only one winning symbol 26 when there might be two or more.

As seen in FIG. 5, the display screen 62 includes all of the display signals having been provided to the display areas 64 to reveal that the first, second, third and fifth windows 18 included play symbols 24 which are not winning symbols 26. The fourth display area 62 shows that the corresponding window 18 includes a winning symbol 26. The preferred display area 62 with the winning symbol 26 includes a line 80 as a visible indication of the winning status. As will be seen, the line 80 is a desirable cumulative indication of a winning ticket 12 but may not be necessary in view of the preferred winning display area 72. The winning display area 72 includes repeated indication of a "WIN" and an arrow 82 including the amount 84 of the win, which is "$0.50" for the particular ticket 12 shown in FIGS. 1, 2 and 3. The preferred arrow 82 is located relative the game information display area 70 and points to the particular winning symbol thereof which is like the winning symbol 26 of the fifth window 18. With the arrow 82 (or arrows 82), the player can quickly see which winning symbol (or winning symbols) are on the ticket 12 and quickly verify the amount 84 to be paid for the winning ticket 12. The preferred game information display area 70 is provided as a portion of the display screen 62 to provide the desired relationship with respect to the winning display area 72. However, it would be possible to provide an alternative game information display area outside of the area of the display screen. The alternative game information display area could be located on a portion of the front panel of the machine in alignment with a side of the display screen and an alternative winning display area thereof.

As seen in FIG. 6, a diagram primarily demonstrates the significance of the electronic control means as it relates to the other preferred components of the lottery ticket dispensing system including various features of the invention. The electronic control circuitry, including the program to process, store and utilize information from other components and to initiate various signals and commands to other components is the central component of the preferred machine 40. The diagram of FIG. 6 is a simplified indication of the existence of the most significant operational connections between the various components of the preferred ticket lottery dispensing system as discussed in detail hereinabove. It should be noted that other connections between the components which are well-known in the vending machine art may not have been discussed hereinabove as being outside the scope of the invention as claimed. For example, as explained, the electronic control circuitry is operably connected to the racks of the ticket storage means but there has heretofore been no discussion of other electronic information that is routinely transmitted between the racks and the electronic control circuitry. Numerous sensors in the racks are employed to determine which rack is to be next used, that there are tickets therein, and/or that one or more of the racks no longer includes any tickets therein. Similarly, there are various continuous signals from the currency receiving and identifying means and from the bar code reading device to the electronic control circuitry to monitor their operation and their ability to properly function to provide the more significant features which were discussed above as they relate to the overall operation of the preferred lottery ticket dispensing system. Accordingly, the various connecting lines between the components not only provide the primary functions discussed above but additional routine functions that are well-known in the vending machine art and outside the scope of the invention as claimed It should be clear that the description provided hereinabove is directed to a preferred embodiment but that numerous alterations could be made to the lottery ticket dispensing machine without departing from the scope of the invention as claimed. The particular ticket 12 is shown for demonstration purposes only and one skilled in the art would recognize that an unlimited variety and form could be employed to alter the number of windows, the type of play symbols, the number and type of winning symbols, and the amount to be paid for various winning tickets for other lottery tickets that could be provided to practice the invention.

In fact, with the preferred ticket information including the winning information, the preferred electronic control means is able to process and store the winning information for use in the winning display area. However, having the description of the preferred embodiments as taught herein, it would be possible for one skilled in the electronic control art to include a bar code marking which have ticket information which does not directly include winning information. An alternative electronic control means could be configured to process specific ticket information that clearly includes the location and character of each of the play symbols for each ticket. The program of the alternative electronic control means could being configured to compare the specific ticket information to all of the possible winning symbol configurations stored therein. Consequently, the alternative electronic control means itself would determine if there were play symbols that are winning symbols and then create the appropriate winning signals to be provided to a winning display area for a similar indication of a winning ticket having been dispensed from the ticket dispensing machine. Any number of other alternatives to the preferred embodiments could be made by those skilled in the art without departing from the scope of the invention as claimed.

As thus described, the ticket 12 and machine 40 would be a significant improvement over the prior art of record since they employ a basic two layer ticket configuration that has been approved by numerous gaming licensing agencies. Such gaming licensing agencies are primarily concerned with security and with possible fraud in the use and sale of such tickets. The use of the two layer configuration with the playing symbols hidden beneath normally closed windows or tabs tends to discourage any tampering with the tickets that could result in the ticket distributor or public being defrauded. It is generally assumed that the unauthorized opening of the windows to reveal the symbols thereunder would be recognized by players or operators and tend to discourage any fraudulent attempt to find "winning" tickets by players who may obtain access to the entire lot of tickets or by operators who may wish to pull "winning" tickets from the lot to cheat players.

The lottery ticket dispensing system discussed above would discourage such physical tampering with the various windows of the tickets because the operating mechanisms for dispensing tickets from the storage racks might not properly function if the tickets are bent or physically altered to prevent neat, aligned stacking within the racks. Accordingly, the system described above would appear to have some of the same physical security features as previous such tickets that have been approved by various gaming licensing agencies. However, because of the inclusion of the bar code on the outside of the tickets, some concern has been expressed that the bar code itself might allow "access" to the status of the hidden play symbols within the tickets. Generally, it is felt that those skilled in the art are capable of devising and creating such bar codes that are not easily or readily decipherable without having detailed information within the programming of the electronic control means. Simply "scanning" the bar code markings without such a program would not reveal the ticket information. Additionally, those skilled in the art am capable of devising numerous means within the programming of the electronic control means for preventing the machine itself from being used to identify and select "winning" tickets from others within the lot. For example, the system may include means for storing the lot numbers of the tickets dispensed therefrom within the electronic control means for auditing at a future date to determine if a lot had been "scanned" more than once. It may also be possible to program the electronic control means to identify and store lot number information so that any attempt to dispense more than the authorized number of tickets from a particular lot would be detected and prevented. Accordingly, it is felt that the lottery ticket dispensing system described hereinabove is as secure or more secure than any other means of selling and dispensing similar such lottery tickets in the past.

Nevertheless, because of any concerns that may exist regarding the bar code markings including ticket information being on the outside of the lottery ticket, another preferred embodiment of the invention includes an improved lottery ticket and an alternative machine specifically adapted for the dispensing the improved tickets which have features to further establish the security and integrity of the lottery ticket system.

Figure 8:
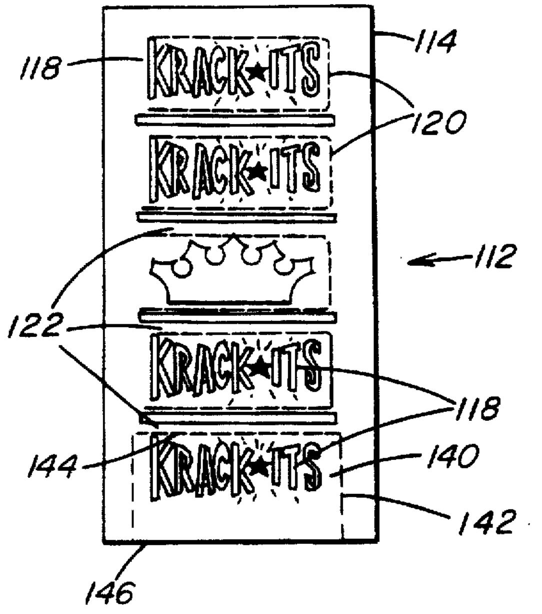
FIG. 8 is a front view of the lottery ticket of FIG. 7 showing the outside of the front sheet.
Figure 9:
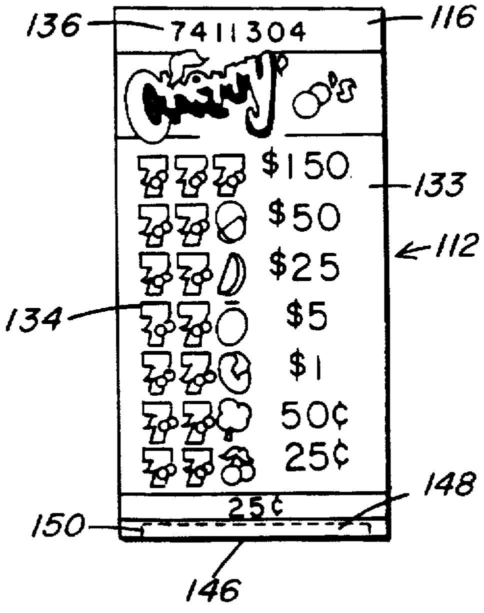
FIG. 9 is a front view of the lottery ticket of FIG. 7 showing the back of the rear sheet.
Figure 10:
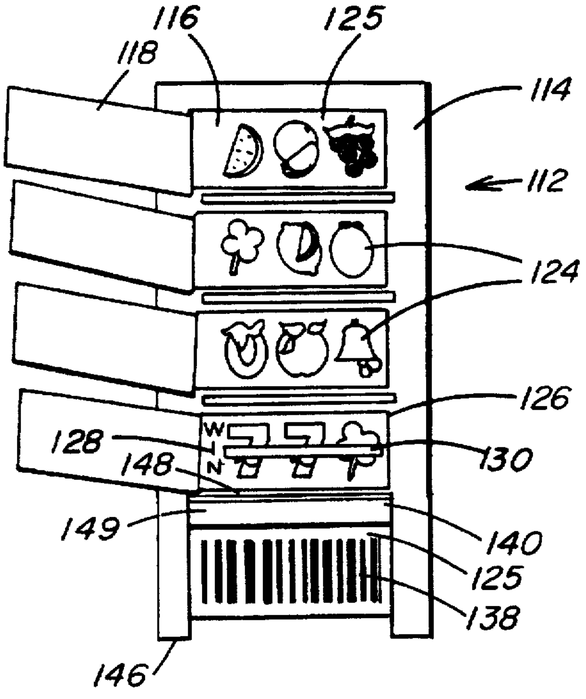
FIG. 10 is another front view of the lottery ticket of FIG. 2 with the play windows open to reveal the play symbols thereunder and the bar code window open to reveal the bar code markings thereunder.
Figure 11:
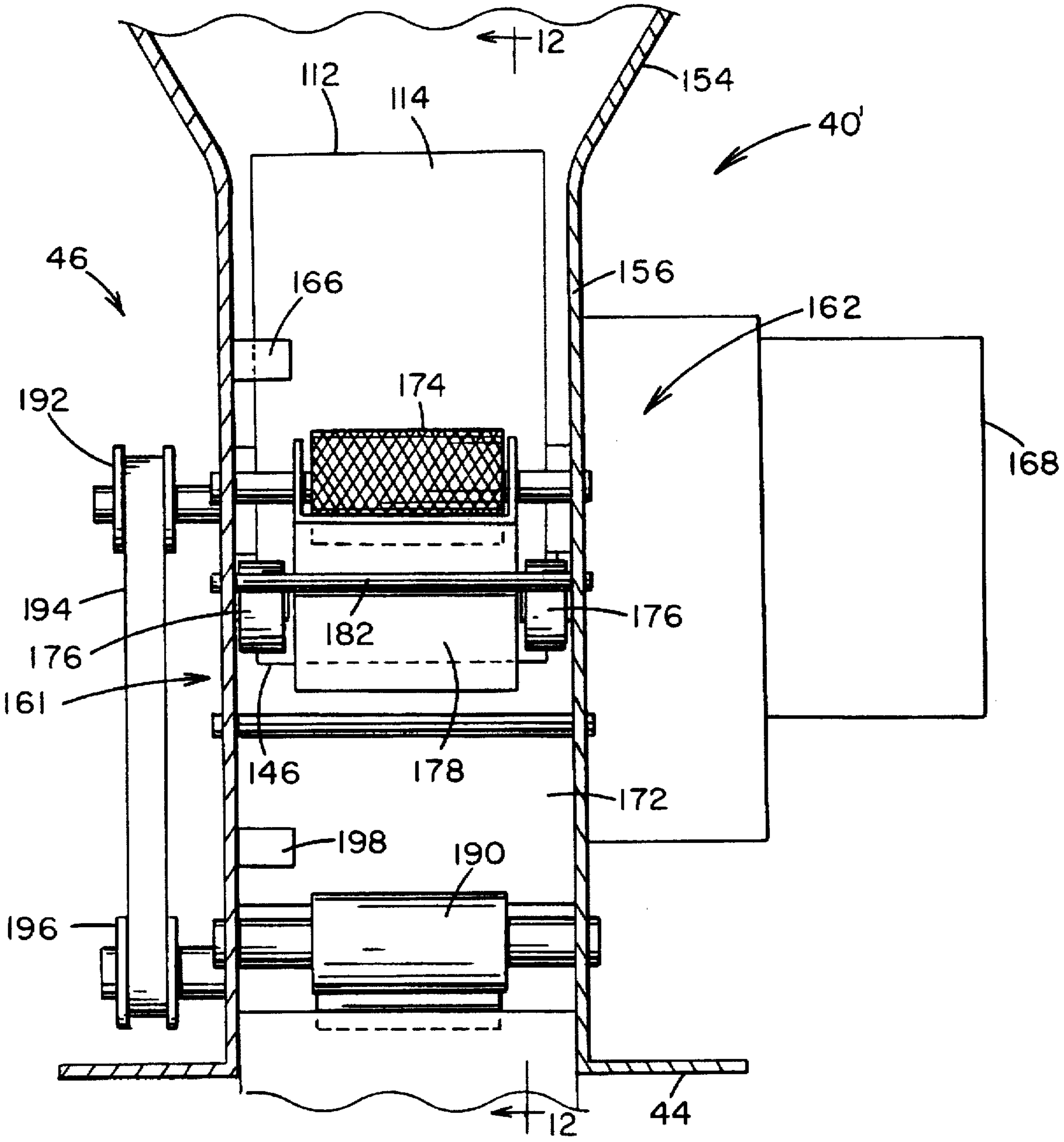
FIG. 11 is a view of the bar code window opening device and ticket advancing components of the lottery ticket dispensing machine of the invention, as generally seen along line 11—11 of FIG. 12, which is configured to dispense a lottery ticket of FIGS. 7 through 10 after it has been dispensed from a storage rack.
Figure 12:
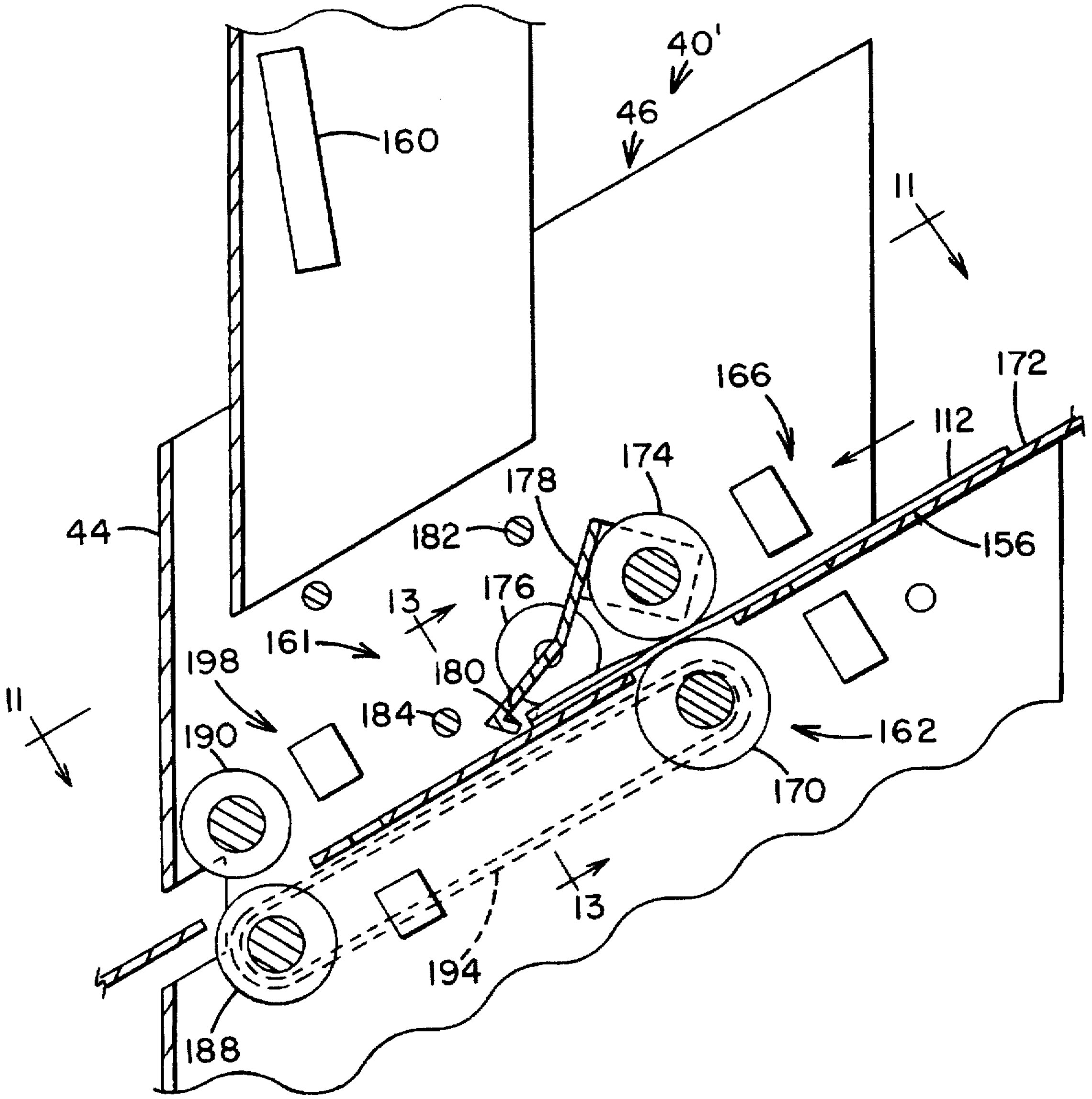
FIG. 12 is a side view of the bar code window opening device and ticket advancing components of the FIG. 11 as seen along line 12—12.

As seen in FIGS. 7, 8, 9 and 10, another preferred lottery ticket dispensing system of the invention includes lottery tickets 112 of a type which are similar to lottery tickets 12 and the pull-tab lottery tickets disclosed in U.S. Pat. No. 4,740,016. The lottery ticket 112 again includes a front sheet 114 and a rear sheet 116 which are generally joined together to provide a unitary structure for the ticket 112. The front sheet 114 includes a plurality of normally closed windows or tabs 118 which are formed by perforations 120 of the front sheet material along three edges of the window 118. The windows 118 can be opened by tearing along the perforations 120 and bending the front sheet material of the windows 118 back along the fourth edge of the window 118 as seen in FIG. 10. The front sheet 114 and the rear sheet 116 are bonded along the edges of the ticket 112 and in the regions 122 between the windows 118.

More specifically, the preferred lottery ticket 112 includes only four windows 118 which are to be selectively opened by the player to reveal four sets of play symbols 124 printed on the inside surface 125 of the rear sheet 116 in alignment with the four windows 118. In the particular lottery ticket 112 shown as an example in FIGS. 7 through 10, the fourth window 118 includes a play symbol 124 that is a winning symbol 126. There is further indication of a winning lottery ticket 112 by the printing of "win" 128 and an additional "line" 130 across the winning symbol 126. Still further, to provide another level of security, of a type generally disclosed and discussed in U.S. Pat. No. 4,740,016, the third window 118 includes an additional winning indication in the form of the printed "monetary amount" 132.

Figure 7:
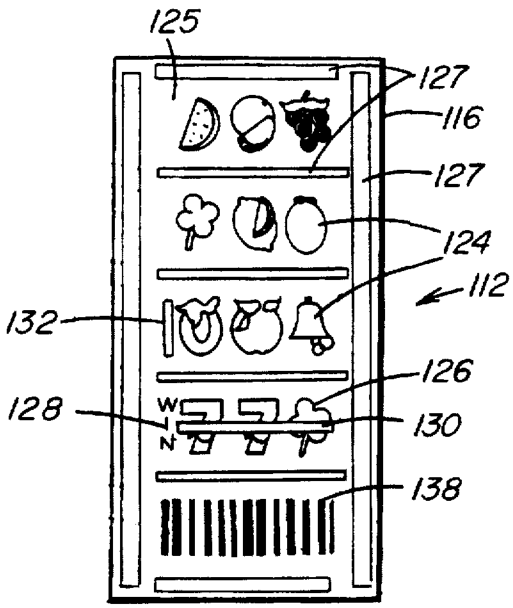
FIG. 7 is a front view of the inside surface of the rear sheet of another preferred lottery ticket which includes various features of the invention and which can be employed in another preferred dispensing machine of the invention.

As seen in FIG. 7, each preferred rear sheet 116 of the lottery tickets 112 is printed in sheet form with a plurality of other rear sheets (not shown) to be later joined to a sheet of matching front sheets prior to being partially cut to form the perforated lines and then being further cut into separate pieces to form the individual lottery tickets 112. During the manufacturing process, the inside surface 125 of the rear sheet 116 is provided glue areas 127 to insure that each of the front sheets 114 are joined to its respective rear sheet 116 along the edges and the regions 122 between the windows 118. More specifically, the inside surface 125 of the preferred rear sheet 116 is provided one less set of play symbols 124 than the ticket 12 discussed above. In the preferred lottery ticket 112, the bottom set of play symbols have been replaced with bar code markings 138 that include the ticket information and winning information in the same manner as the bar code markings 38 of the ticket 12.

While the method of applying the bar code markings 38 to the back or outer side 33 of the rear sheet 16 was a satisfactory way of forming the lottery ticket 12, providing the bar code markings in a location which is remote from the play symbols 26 themselves could present some alignment and correspondence problems during printing. Such problems could occur while trying to insure that there is proper coordination between the bar code markings 38 on the back 33 of the rear sheet 16 and the corresponding play symbols 24 on the inside surface 25 of each of the rear sheets 16. On the other hand, providing the bar code markings 138 to the inside surface 125 of the rear sheet 116 in the same area as the play symbols 124 tends to simplify proper matching and correspondence therebetween. It should be noted that when the large sheet forms containing numerous rear sheets are printed, some sheets will contain all winning symbols while others will contain no winning symbols. In either case, when initially setting up the printing elements, the fact that the bar code markings 138 properly represent the specific play symbols 124 for the ticket 112 can be more readily verified because of their close proximity on the same inside surface 125 of the rear sheets 116. After the large sheets containing the front and rear sheets of each lottery ticket are joined together, they are partially cut to form the perforated lines 120 defining the windows 118 and then severed into individual tickets 112. The plurality of individual tickets 112 forming an entire lot of such tickets are then mechanically shuffled to randomly disperse all of the winning lottery tickets among those which have no winning symbols 126.

As seen in FIGS. 8 and 9, the individual lottery ticket 112 includes the front sheet 114 and the rear sheet 116 joined together in a manner suitable for installation in a stacked array of other such tickets 112 in a storage rack of a ticket dispensing machine. The outer surface of the front sheet 114, shown in FIG. 8, appears to be the same as that of lottery ticket 12 but includes only four windows 118 for covering the four sets of play symbols 124 printed on the inside surface 125 of the rear sheet 116. Additionally, and most significantly, the improved lottery ticket 112, and the front sheet 114 thereof, is further perforated, during the perforating step discussed above, to form a normally closed bar code window 140 which is adapted to be opened to reveal and allow access to the bar code markings 138 therebeneath. Specifically, the preferred perforating step includes providing side perforated lines 142 that can be easily severed and a weakened hinge line 144 that can be easily bent. As best seen in FIG. 10, the preferred bar code window 140 is to be opened at an end edge 146 of the lottery ticket 112 and to be hinged along an hinge edge of the bar code window 140 formed by the line 144 which is parallel with the end edge 146. As will be discussed hereinbelow, the preferred dispensing machine 40' for the tickets 112 is configured to automatically open the bar code window 140 during the passage of the lottery ticket 112 from the storage racks to the front of the machine.

To insure the end edge 146 in the area of the bar code window 140 is sufficiently rigid to allow the bar code window 140 to be properly opened in the dispensing machine 40', the preferred rear sheet 116 includes a edge strip 148. As seen in FIG. 9, the edge strip 148 is defined during the perforating step of the manufacturing process to include weakened edges 150 that allow the strip 148 to be easily severed from the remainder of the rear sheet 116. Because of the location of the glue 127 on the lower portion of the inside surface 125 of the rear sheet 116 in FIG. 7, the edge strip 148 is glued to the inside surface 149 (FIG. 10) of the opening edge 146 of the bar code window 140. Accordingly, a proper force applied to the edge strip 148 tends to separate the edge strip 148 from the remainder of the rear sheet 116 and to open of the bar code window 140 as it hinges along the hinge line 144. The opening of the bar code window 140 in this manner reveals the bar code markings 136 on a portion of the inside surface 125 of the rear sheet 116 which is unaffected by the severing of the edge strip 148.

As seen in FIG. 9, the back or outer surface 133 of the rear sheet 116 is similar to the back 33 of the rear sheet 16 to again include a significant amount of information that is both helpful to the player and useful for the practice of some of the embodiments of the invention. The back 133 includes game information 134 in the form of a series or list of symbols which comprise all of the possible winning symbols 126 for the particular game of this lottery ticket 112. The back 133 of the rear sheet 116 also includes a particular "lot number" 136 which is printed on each and every lottery ticket 112 of the lot to further assure the integrity of the entire lot of such lottery tickets 112. However, because the bar code markings 138 are printed on the inside surface 125 of the rear sheet 116 of the ticket 112, the bar code markings 38, such as those on the back 33 of the ticket 12, are not included. Consequently, as seen in FIGS. 8 and 9, neither the back nor front of the lottery ticket 112 includes any information that could be used to determine if any of the play symbols 124 within the lottery ticket 112 are winning symbols 126. If any player or operator were to attempt to open the windows 118 or the bar code window 140 prior to the lottery tickets 112 being installed in a ticket dispensing machine, the upsetting of the windows 118 or 140 could sufficiently alter the structure of the tickets 112 to effectively prevent the proper dispensing of the tickets from the machine. It has been found that a plurality of lottery tickets that have their windows or bar code windows opened prior to their installation in the storage racks may not be properly stacked therein or reliably discharged from the storage racks to the front of the machine.

As seen in FIG. 10, after the lottery ticket 112 is properly dispensed from the machine, only the bar code window 140 has been opened within the machine to reveal the bar code markings 138 thereunder. Consequently, the player is again able to purchase a lottery ticket 112 and use the machine to determine if there are any winning symbols therein. After the ticket 112, with only the bar code window 140 being opened, is dispensed from the machine 40', the player is able to selectively open the four windows 118 to reveal the play symbols 124 thereunder to verify whether or not it includes the winning symbols 126 as displayed on the display screen 62.

As with the lottery ticket 12 being dispensed from the machine 40 of FIGS. 4, 5 and 6, the lottery ticket 112 is configured to be dispensed from a similar machine 40' of FIGS. 11 through 17 to allow the player to determine electronically the play symbols in the lottery ticket 112. The preferred lottery ticket dispensing machine 40' is very similar to the machine 40 and, from the exterior of the machine, one would not be able to see any difference except for the possible removal of or inactivation of the fifth switch 66 and the absence of the play symbols in the fifth display area 64 of the display screen 62 on the front panel 44 of the machine 40. Clearly, because of there being only four sets of play symbols and associated display areas, the electronic control circuitry (FIG. 16) would be altered accordingly.

However, as seen in FIGS. 11 through 15, the preferred lottery ticket dispensing machine 40' for dispensing the lottery tickets 112 is most significantly configured to open the bar code window 140 and to read the bar code markings 138 thereunder during the dispensing of the ticket 112 from the storage racks 48 to the front panel 44 of the machine 40'. Physically, the machine 40', which is not shown in its entirety in the figures, is similar to the machine 40 except in the lower region of the discharge chute 54, the upper portion of which is aligned with the bottom of the racks 48 to initially receive all of the tickets therefrom prior to their being dispensed to the tray 56 on the front panel 44 of the machine. The machine 40' includes the housing 42 with the interior 46 having ticket storage means in the form of the three ticket racks 48 for holding stacks of lottery tickets 112. The tickets 112 are stacked in the racks 48 with the front sheets 114 up in order to have the bar code markings 138 disposed upwardly after the opening of the bar code window 140. In the machine 40, the tickets 12 are stacked with the front sheets 12 down in order for the back of the rear sheets 14, which have the bar code markings 38, to be disposed upwardly when each ticket 12 is dispensed into the discharge chute 54.

The housing 42 of the machine 40' again includes ticket dispensing initiation means in the form of a currency accepting and verifying device 50 of the type which is well-known in the vending machine art. A ticket 112 is dispensed each time a "play" button 52 of the ticket dispensing initiation means is pushed after a proper amount of currency is deposited in the device 50. The device 50 and button 52 are operably connected to electronic control means (FIG. 16) which is preferably in the form of a printed circuit board and associated wiring in the housing 42 which connects various components of the machine 40'.

The bottoms of the ticket racks 48 are aligned with an alternative discharge chute 154 (FIGS. 11 through 15) which is adapted to direct the passage of each ticket 112 from the ticket storage means in the interior 46 of the machine 40' to a tray 56 on the front panel 44. The machine 40' does not include a ticket retarding means or normally closed gate 58 as provided in the machine 40. While there is a bar code reading device 160, it is not disposed in the same location the bar code reading device 60 of the machine 40.

The front panel 44 of the preferred machine 40' again includes an electronic display screen 62 (FIG. 17) which is capable of displaying the various play symbols 124 on the lottery ticket 112 for the player. The display screen 62 includes only four display areas 164 which correspond to the four windows 118 of the lottery ticket 112 being dispensed by the machine 40'. The front panel 44 includes a plurality of switches 66 which are directly associated with the display areas 164. The fifth switch 66 is removed or inactivated for this particular lottery ticket 112. Each of the switches 66 and display areas 164 are operably connected to the electronic control means (FIG. 16) so that an activation signal from one of the switches 66 will again cause the electronic control means to generate a display signal for its corresponding display area 164. The front panel 44 can again include the combined switch 68 which can be activated to cause the electronic control means to generate a display signal for each of the display areas 164 to reveal all of the play symbols 124 aligned with the windows 118 of the ticket 112 dispensed from the machine 40'. The display screen 62 also includes the game information display area 70 and the winning display area 72, for the machine 40', in order to provide additional features of the invention which can be conveniently used to play the game.

To dispense and play the lottery tickets 112, a player will operate the machine 40' in the same manner as the machine 40. However, as best seen in FIGS. 11 through 15, the interior 46 of the machine 40' is configured to include the alternative discharge chute 154, the upper portion of which is aligned with the bottom of the storage racks 48 to receive each of the lottery tickets 112 therefrom. The chute 154 narrows to define a lower portion 156 which is slightly wider than the ticket 112 to cause the end edge 146 to first proceed toward the front panel 44. Bar code window opening means 161 is disposed in the lower portion 156 of the chute 154 for opening the bar code window 140 to reveal the bar code markings 138 of the ticket 112. The bar code window opening means 161 specifically includes ticket advancing means 162 for positively advancing the lottery ticket 112 through the lower portion 158 toward the front panel 44.

After activation of the ticket dispensing initiation means, the ticket 112 is advanced by gravity to the lower portion 156 of the chute 154. In the preferred embodiment of the invention, a first light emitting sensor 166 will sense the passage of the end edge 146 of a ticket 112 into the lower portion 156 and activate the bar code window opening means 161 and the ticket advancing means 162. Specifically, a motor 168 of the ticket advancing means 162 causes a drive roller 170, which extends through an opening in the bottom wall 172 of the lower portion 156 to be slightly above the upper surface thereof, to rotate in a counterclockwise direction as viewed in FIGS. 12, 14 and 15. The drive roller 170 is preferably made of metal and knurled to produce corresponding rotation of an aligned knurled, metal roller 174 to cause the ticket 112 to be entrapped therebetween and advanced down the lower portion 156. The knurled surfaces of the rollers 170, 174 insure positive gripping of the tickets 112 and have been found to form an indented pattern in the surfaces of the ticket 112 to provide an additional feature of "marking" the ticket 112 during its passage therethrough. Consequently, each ticket 112 dispensed from the machine 40' should include only one set of such "markings" to serve as a positive indication that the particular ticket 112 has not been previously advanced through the ticket advancing means 162

Figure 13:
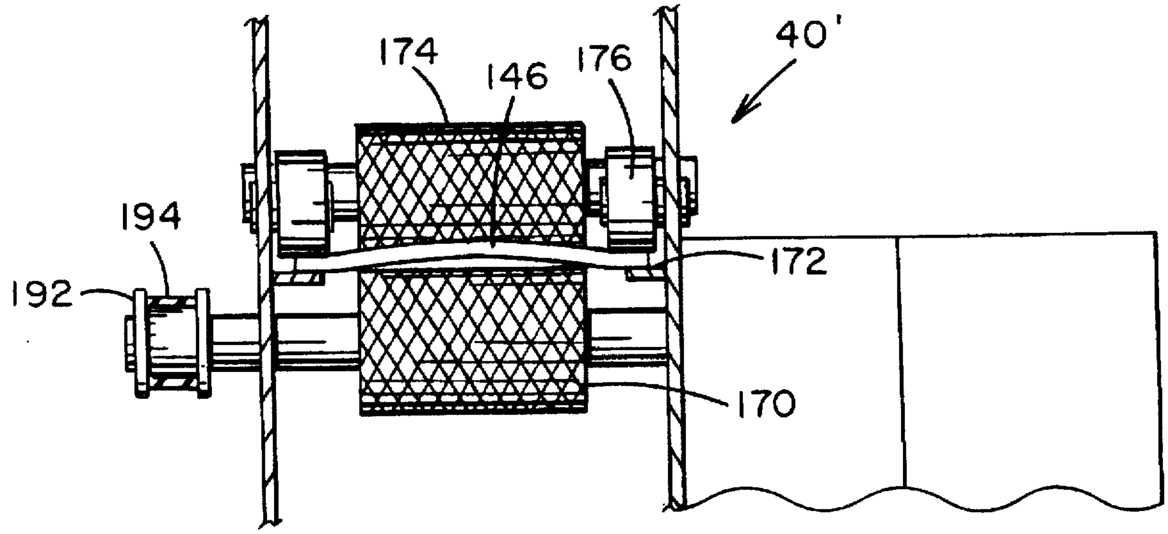
FIG. 13 is a view of the ticket advancing components as seen along line 13—13 of FIG. 12 with the bar code window opening hook element removed to shown the leading edge of the lottery ticket.
Figure 14:
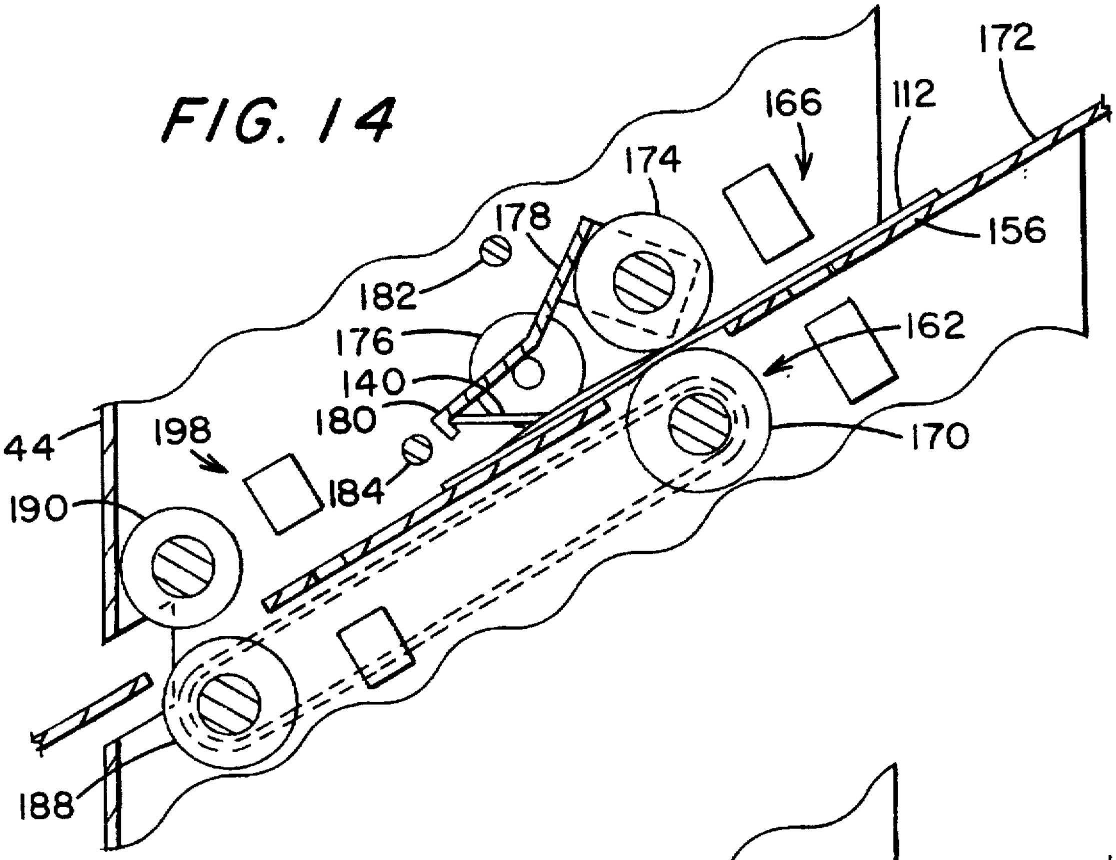
FIG. 14 is a view like that of FIG. 12 with the lottery ticket advanced to a position at which the bar code window is partially opened.

As the end edge 146 of the ticket 112 leave the rollers 170, 174, it is initially slightly raised from the upper surface of the bottom wall 172 because of the slightly raised position of the lower roller 170. However, as best seen in FIG. 13, a pair of free rolling side rollers 176 are aligned with the outer edges of the ticket 112 to cause the center of the leading end edge 146 to be bowed upwardly above the bottom wall 172. A hook element 178 of the bar code window opening means 161 is mounted to rotate or pivot about the shaft of the upper roller 174 to cause a hook end 180 thereof the lie by gravity against the bottom wall 172 of the lower portion 156. The hook end 180 is in alignment with the advancing leading end edge 146 of the ticket 112. The bowing of the leading end edge 146 insures that the hook end 180 will catch the edge strip 148 and the center portion of the end edge 146 which forms the leading part of the bar code window 140. Engagement with hook end 180 tends to retard the edge strip 148 and the end edge 146 of the window 140 as the remainder of the lottery ticket continues to advance down the lower portion 156 of the chute 154. With the side edges of the lottery ticket being held down by the side rollers 176, there is a tearing of the weakened edges 150 of the strip 148 and the side lines 142 of the bar code window 140. As seen in FIG. 14, the continuing, forced advancement of the ticket 112 by the rollers 170, 174 causes the bar code window 140 to be opened as it hinges along the hinge line 144.

During the opening process, the hook element 178 is capable of rotating upwardly until it makes contact with the hook stop 182. Prior to the hook element 178 being sufficiently rotated to make contact with the stop 182, the edge strip 148 and end edge 146 of the bar code window 140 will be released from the hook end 180 as the ticket 112 proceeds down the lower portion 156 of the chute 154. In order to insure that the bar code window 140 does not close after disengagement from the hook end 180, guide means 184 will cause the bar code window 140 to remain in the opened position as shown in FIG. 15.

Figure 15:
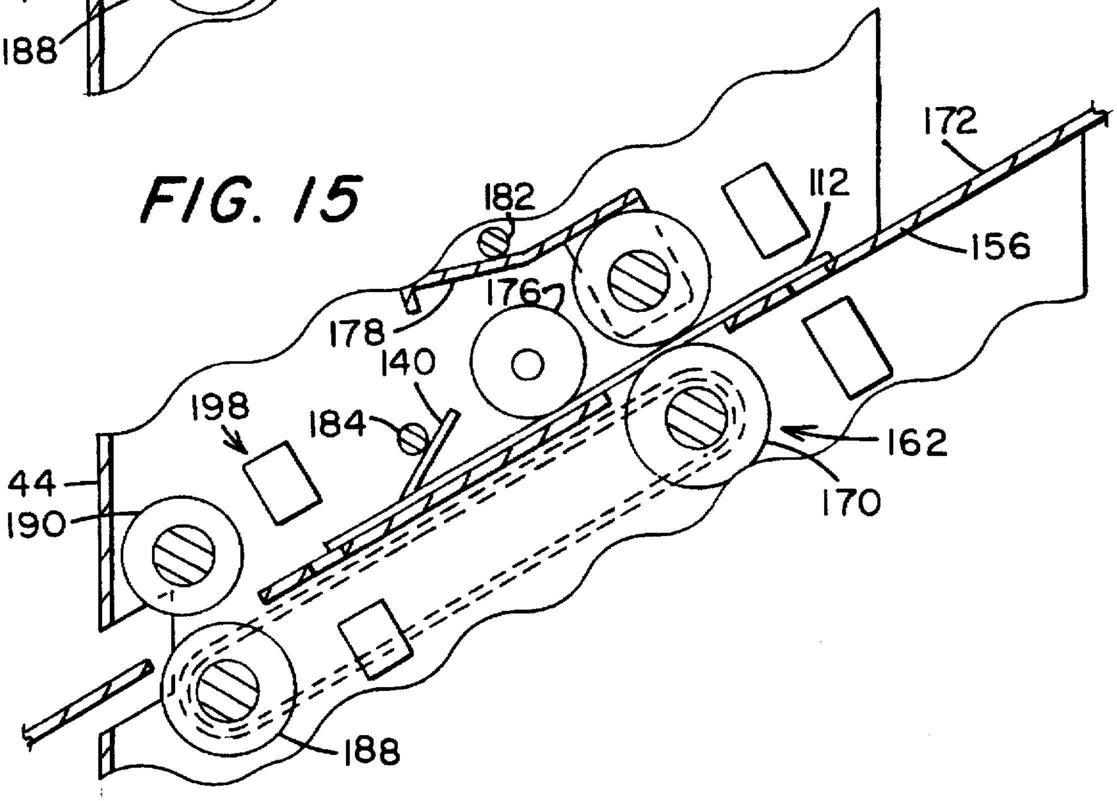
FIG. 15 is a view like that of FIG. 14 with the lottery ticket further advanced to a position at which the bar code window is opened just prior to being dispensed from the front of the machine.

As the lottery ticket 112, with the bar code window 140 opened, advances to the position as generally shown in FIG. 15, the bar code reading device 160 will read the bar code markings 138 and store the ticket information thereof in the electronic control circuit. The preferred bar code reading device 160 is capable of reading the bar code markings 138 as the ticket 112 continues to move down the lower portion 156 of the chute 154.

To insure that the lottery ticket 112 continues to advance to the front panel 44 on the machine 40' with the window 140 in the opened position, an additional set of rollers 188, 190 are disposed at the end of the lower portion 156. A pulley 192 mounted on the opposite end of the shaft of the drive roller 170 from the motor 168 supports a belt 194 that extends to a similar pulley 196 on the corresponding end of the shaft of the roller 188. The rollers 188, 190 have rubber surfaces and are closely spaced one from the other to receive the ticket 112, with the window 140 opened, therebetween for positive advancement to the front panel 44. With both roller 170 and roller 188 rotating in the same direction as soon as a ticket 112 is sensed by the first light emitting sensor 166, the ticket 112 quickly and continuously advances down the lower portion 156 of the chute 154 until it is discharged from the front panel 44 to the tray 56 to be collected by the player.

However, such continuous movement is only intended and desirable if the bar code reading device 160 is capable of properly reading the bar code markings 138 and storing the ticket information in the electronic control circuit. Accordingly, a second light emitting sensor 198 is located in the lower portion 156 adjacent the rollers 188, 190. The second sensor 198 is operably connected to the electronic contra circuit and is capable of directing a signal thereto when the presence of a lottery ticket 112 is detected. If there is a lottery ticket 112 aligned with the second sensor 198 and the electronic control circuit has not properly received any ticket information from the bar code reading device 160, the electronic control circuit will cause the motor 168 to stop and "instruct" the bar code reading device 160 to attempt another reading of the bar code markings 138. If the second attempt is successful, the electronic control circuit will re-energize the motor 168 to cause the ticket 112 to be advanced out of the machine 40' to the player. However, if an accurate reading of the bar code markings 138 can not be obtained after several attempts, the electronic control circuit would activate some type of alarm means to indicate that an attendant is required to correct a problem with the machine 40'.

Figure 16:
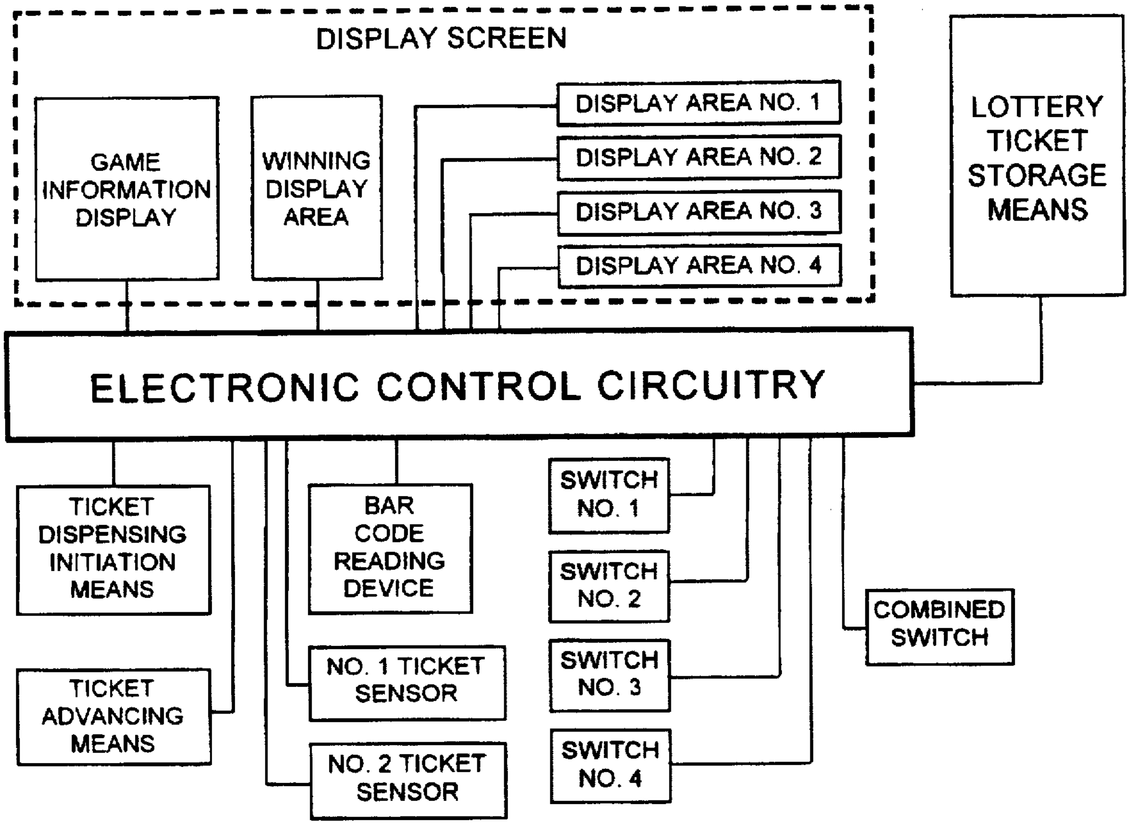
FIG. 16 is a block diagram demonstrating the relationships of the operating components of the lottery ticket machine of FIGS. 11 through 15 including various features of the invention.

As seen in FIG. 16, a diagram primarily demonstrates the significance of the electronic control means as it relates to the other preferred components of the lottery ticket dispensing system of FIGS. 7 through 15 and 17 including various features of the invention. The electronic control circuitry, including the program to process, store and utilize information from other components and to initiate various signals and commands to other components, is the central component of the preferred machine 40'. The diagram of FIG. 16, like that of FIG. 6, is a simplified indication of the existence of the most significant operational connections between the various components of the preferred ticket lottery dispensing system as discussed in detail hereinabove.

Figure 17:
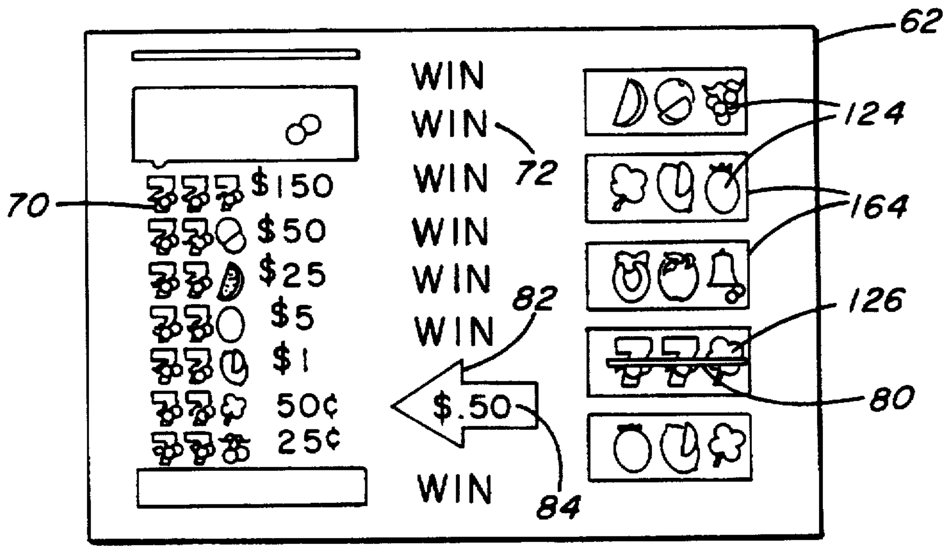
FIG. 17 is an enlarged view of the display screen of the lottery ticket dispensing machine of FIGS. 11 through 15 for dispensing the lottery ticket of FIGS. 7 through 10.

As seen in FIG. 17, the display screen 62 for the machine 40' includes all of the display signals having been provided to the display areas 164 to reveal that the first, second and third windows 118 of the particular lottery ticket 112 included play symbols 124 which are not winning symbols 126. The fourth display area 164 shows that the corresponding fourth window 118 includes a winning symbol 126. The preferred display area 164 with the winning symbol 126 includes a line 80 as a visible indication of the winning status. The winning display area 72 again includes repeated indication of a "WIN" and an arrow 82 including the amount 84 of the win, which is "$0.50" for the particular ticket 112 shown in the FIGS. 7 through 10. The preferred arrow 82 is located relative the game information display area 70 and points to the particular winning symbol thereof which is like the winning symbol 126 of the fourth window 118. With the arrow 82 (or arrows 82), the player can quickly see which winning symbol (or winning symbols) are on the ticket 112 and quickly verify the amount 84 to be paid for the winning ticket 112.

Clearly, numerous alterations could be made to the preferred lottery ticket 112 and the preferred machine 40' without departing from the scope of the invention as claimed. For example, although the preferred machine 40' includes the first light emitting sensor 166 to indicate the passage of the lottery ticket 112 into the lower portion 156 of the chute 154 for starting the motor 168, it is possible for the motor 168 to be alternatively started by a time delay feature in the electronic control circuit. Because all of the tickets 112 dispensed from each of the racks 48 will tend to take about the same amount of time to arrive at the rollers 170, 174, the motor 168 could be configured to start, after a short time delay, each time that the ticket dispensing initiation means is activated.

It is clear that the preferred lottery ticket 112 includes the windows 118 and the bar code window 140 on the same front sheet 114. However, the physical features providing the bar code window 140 are such that it could just as reasonably be formed in the rear sheet 116 of the same ticket 112 as long as it is located in the same general region thereof so as not to overlie the windows 118. If the bar code window 140 were to be on the back of the rear sheet 116, the tickets would be installed in the storage racks with the rear sheet 116 up in order to properly present the bar code window 140 to the bar code window opening means 161. Of course, with the window 140 on the rear sheet 116, one might assume that the bar code markings 138 would be printed on the inside surface 149 of the front sheet 114 rather than on the inside surface 125 of the rear sheet 116. While physically such a configuration would be acceptable and within the scope of the invention as claimed, this would appear to negate one of the advantages of the lottery ticket 112 which includes the preferred feature of printing the play symbols 124 and the bar code markings 138 on the same inside surface 125 of the rear sheet 116. However, as seen in FIG. 15, when the bar code window 140 is opened, the inside surface 149 of the front sheet 114 would also be aligned with and exposed to the bar code reading device 160. Accordingly, if the bar code window were to be provided on the rear sheet 116 to be opened in the dispensing machine, the bar code markings 138 could be printed on the inside surface 125 of the rear sheet 116 in the same general position as shown in FIG. 7 since it could be properly presented to the bar code reading device 160 on the inside surface of the bar code window itself after it is opened.

The preferred bar code window 140, which conceals bar code markings on the inside surface of one sheet of the ticket, is located at the leading edge of the ticket as it is advanced though the machine 40'. The preferred position has been selected to offer a simple and convenient means for automatically opening the bar code window in the preferred machine. However, it should be recognized that one skilled in the vending machine art might be able to provide a bar code window with a different configuration and/or at a different location on a lottery ticket and to provide a different, and perhaps more complicated, bar code window opening device in a machine which could again open the window to read the bar code markings thereunder. Such a configuration would still be within the scope of the invention as claimed.

It might also be possible for one skilled in the vending machine art to devise a lottery ticket that has some other form or means for covering the bar code markings to prevent them from being observed by examination of the exterior of the ticket. It is felt that the use of a machine to automatically remove such a cover to specifically reveal the bar code markings thereunder by a different mechanical or chemical means than that specifically disclosed herein would still be a mechanical equivalent of the present invention and within the scope of the invention as claimed herein.

What is claimed is:

1. A lottery ticket dispensing system for lottery tickets of the type which includes a front sheet having window means which are normally closed, a rear sheet, means for bonding the front sheet and the rear sheet together, play symbols on an inward side of the rear sheet toward an inward side of the front sheet, the play symbols capable of being winning symbols, the play symbols being located in play regions on the inward side of the rear sheet in alignment with the window means, and the window means for being opened to reveal the play symbols in the play regions thereunder, said lottery ticket dispensing system comprising:

a bar code window in one of the front sheet and the rear sheet of the lottery ticket which said bar code window is normally closed;

bar code markings for each lottery ticket on at least one of the inward side of said bar code window and the inward side of the other of the rear sheet and the front sheet in alignment with said bar code window;

said bar code markings including ticket information for indicating the play symbols in the play regions as aligned with the window means;

a lottery ticket dispensing machine including a housing and a front panel;

ticket storage means in said housing for storing a plurality of the lottery tickets;

electronic control means in said housing including ticket dispensing means for dispensing each lottery ticket from said ticket storage means for advancement toward said front panel;

bar code window opening means in said housing for opening said bar code window to reveal said bar code markings of each lottery ticket dispensed from said ticket storage means;

a bar code reading device in said housing adjacent to said bar code window opening means operably connected to said electronic control means for reading and identifying the bar code markings of each lottery ticket and for storing said ticket information in said electronic control means regarding the play symbols as located in the play regions as each lottery ticket advances toward said front panel;

said front panel having display areas which directly correspond to the play regions on the inward side of the rear sheet of the lottery ticket;

said display areas being operably connected to said electronic control means for receiving display signals therefrom;

means for providing an actuation signal to said electronic control means to cause said electronic control means to generate said display signals for said display areas;

said display signals producing display symbols in said display areas; and, for each lottery ticket having been dispensed from said ticket storage means, said display symbols in said display areas being directly indicative of the play symbols of the play regions which correspond to said display areas.

2. The lottery ticket dispensing system according to claim 1, wherein said bar code window opening means includes ticket advancing means in said housing for advancing each lottery ticket dispensed from said ticket storage means toward said bar code reading device.

3. The lottery ticket dispensing system according to claim 2, wherein the lottery ticket includes a center and a leading end edge during the advancing toward said bar code reading device; said bar code window is disposed adjacent the leading end edge of the lottery ticket; said bar code window includes an opening edge which forms part of the leading end edge of the lottery ticket and a hinge edge which is parallel with the leading end edge of the lottery ticket and is displaced therefrom toward the center of the lottery ticket; and said bar code window opening means includes retarding means for retarding said opening edge relative to a remainder of the lottery ticket to cause said bar code window to hinge at said hinge edge during the advancing toward said bar code reading device.

4. The lottery ticket dispensing system according to claim 3, wherein said retarding means includes a hook element for hooking said opening edge of said bar code window during the advancing toward said bar code reading device.

5. The lottery ticket dispensing system according to claim 4, wherein said opening edge of said bar code window includes an edge strip of the rear sheet along the leading end edge of the lottery ticket to reinforce said opening edge during the opening of said bar code window by said hook element.

6. The lottery ticket dispensing system according to claim 2, wherein said ticket storage means includes a discharge chute for passage of the lottery ticket from an interior of said housing to an exterior of said housing at said front panel, said discharge chute includes said ticket advancing means for advancing each lottery ticket dispensed from said ticket storage means toward said bar code reading device, and said bar code reading device is aligned with said discharge chute and any lottery ticket therein.

7. The lottery ticket dispensing system according to claim 1, wherein said ticket information of said bar code markings include winning information when the play symbols are winning symbols, said front panel includes a winning display area, said electronic control means identifies and stores said winning information, said electronic control means generates a winning signal When said winning information is in said ticket information, said winning display area is operably connected to said electronic control means for receiving said winning signal therefrom, and said winning signal produces a winning indication in said winning display area after said electronic control means generates said display signals for said display areas.

8. The lottery ticket dispensing system according to claim 7, wherein said front panel includes game information indicating a plurality of possible winning symbols associated with the lottery tickets in said ticket storage means and said winning indication in said winning display area is displayed relative to a corresponding said winning symbol in said game information on said front panel.

9. The lottery ticket dispensing system according to claim 1, wherein said means for providing said actuation signal includes switch means on said front panel associated with said display areas, said switch means is operably connected to said electronic control means, and said switch means is for being selectively actuated to provide said actuation signal to said electronic control means to cause said electronic control means to generate said display signals for said display areas.

10. The lottery ticket dispensing system according to claim 1, wherein said bar code window is in the front sheet and said bar code markings are on the inward side of the rear sheet of each lottery ticket.

11. A lottery ticket dispensing system for lottery tickets of the type which includes a front sheet having window means which are normally closed, a rear sheet, means for bonding the front sheet and the rear sheet together, a plurality of play symbols on an inward side of the rear sheet toward an inward side of the front sheet, at least some of the play symbols capable of being winning symbols, the play symbols being respectively located in various regions of the inward side of the rear sheet aligned with the window means, and the window means for being selectively opened to reveal the play symbols in the various regions thereunder, said lottery ticket dispensing system comprising:

a bar code window in one of the front sheet and the rear sheet of the lottery ticket which said bar code window is normally closed;

bar code markings for each lottery ticket on at least one of the inward side of said bar code window and the inward side of the other of the rear sheet and the front sheet in alignment with said bar code window;

said bar code markings including ticket information for indicating each of the play symbols in the various regions as aligned with the window means;

a lottery ticket dispensing machine including a housing and a front panel;

ticket storage means in said housing for storing a plurality of the lottery tickets;

electronic control means in said housing including ticket dispensing means for dispensing each lottery ticket from said ticket storage means for advancement toward said front panel;

bar code window opening means in said housing for opening said bar code window to reveal said bar code markings of each lottery ticket dispensed from said ticket storage means;

a bar code reading device in said housing adjacent to said bar code window opening means operably connected to said electronic control means for reading and identifying said bar code markings of each lottery ticket and for storing said ticket information in said electronic control means regarding each of the play symbols as located in the various regions as each lottery ticket advances toward said front panel;

said front panel having a plurality of display areas which directly correspond to the various regions on the inward side of the rear sheet of the lottery ticket;

each of said display areas being operably connected to said electronic control means for receiving display signals therefrom;

said front panel having switch means associated with said each of said display areas;

each of said switch means being operably connected to said electronic control means;

said each switch means is for being selectively actuated to provide said actuation signal to said electronic control means to cause said electronic control means to generate said display signal for said each display area associated with said switch means;

said display signal producing a display symbol in said display area; and, for each lottery ticket having been dispensed from said ticket storage means, said display symbol in said each display area being directly indicative of the play symbol of each of the various regions which corresponds to said display area associated with said each switch means that has been selectively actuated.

12. The lottery ticket dispensing system according to claim 11, wherein said bar code window opening means includes ticket advancing means in said housing for advancing each lottery ticket dispensed from said ticket storage means toward said bar code reading device.

13. The lottery ticket dispensing system according to claim 12, wherein said ticket storage means includes a discharge chute for passage of the lottery ticket from an interior of said housing to an exterior of said housing at said front panel, said discharge chute includes said ticket advancing means for advancing each lottery ticket dispensed from said ticket storage means toward said bar code reading device, and said bar code reading device is aligned with said discharge chute and any lottery ticket therein.

14. The lottery ticket dispensing system according to claim 11, wherein said ticket information of said bar code markings include winning information when the play symbols are winning symbols, said front panel includes a winning display area, said electronic control means identifies and stores said winning information, said electronic control means generates a winning signal when said winning information is in said ticket information, said winning display area is operably connected to said electronic control means for receiving said winning signal therefrom, and said winning signal produces a winning indication in said winning display area after said electronic control means generates said display signals for said display areas.

15. The lottery ticket dispensing system according to claim 14, wherein said front panel includes game information indicating a plurality of possible winning symbols associated with the lottery tickets in said ticket storage means and said winning indication in said winning display area is displayed relative to a corresponding said winning symbol in said game information on said front panel.

16. The lottery ticket dispensing system according to claim 11, wherein said front panel includes a combined switch means, said combined switch means is operably connected to said electronic control means, said combined switch means is capable of being actuated to generate said display signals for all of said display areas associated with said switch means for each lottery ticket having been dispensed from said ticket storage means to produce said display symbols in all of said display areas.

17. The lottery ticket dispensing system according to claim 11, wherein said bar code window is in the front sheet and said bar code markings are on the inward side of the rear sheet of each lottery ticket.

18. A method of dispensing lottery tickets of the type which includes a base sheet having a plurality of play symbols respectively disposed within a plurality of regions on an inward side of the base sheet, a cover sheet having an inward side disposed over the inward side of the base sheet, the cover sheet having normally closed window means aligned with the plurality of regions to hide the play symbols thereunder, and at least some of the play symbols capable of being winning symbols, said method comprising the steps of:

providing bar code markings for each lottery ticket on a bar code portion of the inward side of one of the base sheet and the cover sheet which bar code markings include ticket information for indicating each of the play symbols as arranged in the plurality of regions on the inward side of the base sheet;

providing a machine having a housing and a front panel;

storing a plurality of the lottery tickets in said housing;

dispensing a lottery ticket from said housing to said front panel;

relatively separating said bar code portion of the inward side of said one of the base sheet and the cover sheet and a corresponding portion of the inward side of the other of the base sheet and the cover sheet to reveal said bar code markings of each lottery ticket during said dispensing from said housing;

reading said bar code markings to identify said ticket information and storing said ticket information regarding each of the play symbols as arranged in said plurality of regions on the inward side of the base sheet after said relatively separating;

providing a plurality of display areas on said front panel which directly correspond to the plurality of regions having play symbols; and utilizing said ticket information from said storing to display a display symbol in said display area which is directly indicative of the play symbol of each of the regions on the inward side of the base sheet of the lottery ticket that has been dispensed from said housing.

19. The method of dispensing lottery tickets according to claim 18, wherein said providing said bar code markings for each lottery ticket includes the steps of providing a bar code window in one of the cover sheet and the base sheet of each lottery ticket which said bar code window is normally closed and locating said bar code portion on at least one of the inward side of said bar code window and the inward side of the other of the base sheet and the cover sheet in alignment with said bar code window to hide said bar code markings thereunder when said bar code window is closed and said relatively separating said bar code portion and said corresponding portion includes the step of opening said bar code window.

20. The method of dispensing lottery tickets according to claim 19, wherein said providing said bar code window is in the cover sheet and said locating said bar code portion is on the inward side of the base sheet in alignment with said bar code window in the cover sheet of each lottery ticket.

21. The method of dispensing lottery tickets according to claim 19, wherein said opening said bar code window occurs during a step of advancing the lottery ticket prior to said reading said bar code markings during said dispensing to said front panel.

22. The lottery ticket dispensing system according to claim 21, wherein the lottery ticket includes a center and a leading end edge during said advancing; further including the step of providing said bar code window adjacent the leading end edge of the lottery ticket with an opening edge which forms part of the leading end edge of the lottery ticket and a hinge edge which is parallel with the leading end edge of the lottery ticket and is displaced therefrom toward the center of the lottery ticket; and said opening said bar code window includes retarding said opening edge relative to a remainder of the lottery ticket to cause said bar code window to hinge at said hinge edge during said advancing prior to said reading said bar code markings.

23. The lottery ticket dispensing system according to claim 22, wherein said retarding includes hooking said opening edge of said bar code window during said advancing.

24. The method of dispensing lottery tickets according to claim 18, wherein said dispensing the lottery ticket includes discharging the lottery ticket from an interior of said housing to an exterior of said housing at said front panel along a discharge chute, further including the step of advancing the lottery ticket along said discharge chute during said reading of said bar code markings for continued passage to said front panel after said storing of said ticket information.

25. The method of dispensing lottery tickets according to claim 24, further including the step of temporally discontinuing said advancing the lottery ticket along said discharge chute with said bar code markings of the lottery ticket aligned in said discharge chute for said reading said bar code markings until said reading is properly completed.

26. The method of dispensing lottery tickets according to claim 18, wherein said providing said bar code markings on each lottery ticket to further include winning information when the play symbols are winning symbols, said reading said bar code markings to identify and store said winning information as the lottery ticket is dispensed from said housing and further including the steps of providing a winning display area on said front panel and displaying a winning indication in said winning display area when displaying said display symbols in said display areas when an associated region has play symbols which are winning symbols.

27. The method of dispensing lottery tickets according to claim 18, further including the step of providing currency receiving means in said housing for receiving currency of a predetermined amount and said dispensing the lottery ticket can occur after said currency of said predetermined amount has been received in said currency receiving means.

28. An improved lottery ticket for being dispensed by a machine and being of the type which includes a front sheet having window means which are normally closed, a rear sheet, means for bonding the front sheet and the rear sheet together, play symbols on an inward side of the rear sheet toward an inward side of the front sheet, the play symbols capable of being winning symbols, the play symbols being located in play regions on the inward side of the rear sheet in alignment with the window means, and the window means for being opened after the lottery ticket is dispensed from the machine to reveal the play symbols in the play regions thereunder, said improvement comprising:

a bar code cover on one of the front sheet and the rear sheet of the lottery ticket;

bar code markings for the lottery ticket on one of the front sheet and the rear sheet in alignment with said bar code cover;

said bar code cover being normally in a position to cover said bar code markings to prevent any viewing thereof when stored in the machine;

said bar code cover for being removed by the machine during the dispensing thereof to reveal said bar code markings thereunder; and said bar code markings including ticket information capable of being read by the machine after the removal of said bar code cover by the machine for indicating the play symbols in the play regions as aligned with the window means.

29. An improved lottery ticket of the type which includes a front sheet having window means which are normally closed, a rear sheet, means for bonding the front sheet and the rear sheet together, play symbols on an inward side of the rear sheet toward an inward side of the front sheet, the play symbols capable of being winning symbols, the play symbols being located in play regions on the inward side of the rear sheet in alignment with the window means, and the window means for being opened to reveal the play symbols in the play regions thereunder, said improvement comprising:

a bar code window in one of the front sheet and the rear sheet of the lottery ticket which said bar code window is normally closed;

bar code markings for the lottery ticket on at least one of the inward side of the bar code window and the inward side of the other of the rear sheet and the front sheet in alignment with said bar code window;

said bar code markings including ticket information for indicating the play symbols in the play regions as aligned with the window means; and said bar code window for being opened to reveal said bar code markings thereunder.

30. The improved lottery ticket according to claim 29, wherein ticket information of said bar code markings include winning information when the play symbols are winning symbols.

31. The improved lottery ticket according to claim 29, wherein said bar code window is in the front sheet and said bar code markings are on the inward side of the rear sheet of each lottery ticket.

32. The improved lottery ticket according to claim 31, wherein the lottery ticket includes a center and an end edge, said bar code window is disposed adjacent the end edge of the lottery ticket to include an opening edge which forms part of the end edge of the lottery ticket and a hinge edge which is parallel with the end edge of the lottery ticket and is displaced therefrom toward the center of the lottery ticket, and said bar code window is for being opened by being hinged at said hinge edge relative to a remainder of the lottery ticket.

33. The improved lottery ticket according to claim 32, wherein said opening edge of said bar code window includes an edge strip of the rear sheet along said end edge of the lottery ticket to reinforce said opening edge during the opening of said bar code window.

* * * * *